United States Patent
Wood

(10) Patent No.: US 7,904,280 B2
(45) Date of Patent: Mar. 8, 2011

(54) SIMULATION OF CONSTRAINED SYSTEMS

(75) Inventor: Giles D. Wood, Brookline, MA (US)

(73) Assignee: The MathWorks, Inc., Natick, MA (US)

( * ) Notice: Subject to any disclaimer, the term of this patent is extended or adjusted under 35 U.S.C. 154(b) by 981 days.

(21) Appl. No.: 10/414,811

(22) Filed: Apr. 16, 2003

(65) Prior Publication Data

US 2004/0210426 A1    Oct. 21, 2004

(51) Int. Cl.
| | |
|---|---|
| G06F 17/00 | (2006.01) |
| G06F 15/18 | (2006.01) |
| G06F 17/50 | (2006.01) |
| G06F 7/60 | (2006.01) |
| G06G 7/48 | (2006.01) |
| G06G 7/50 | (2006.01) |
| G05B 19/18 | (2006.01) |
| G05B 11/32 | (2006.01) |
| G05B 19/42 | (2006.01) |
| G05B 19/04 | (2006.01) |
| G06E 1/00 | (2006.01) |

(52) U.S. Cl. ............ 703/2; 703/6; 703/9; 703/14; 700/2; 700/67; 700/86; 700/246; 706/1; 706/10; 706/45; 701/41; 716/20

(58) Field of Classification Search .................. 703/2, 6, 703/9, 14; 700/2, 67, 86, 246; 716/20; 701/41; 706/1, 10, 45

See application file for complete search history.

(56) References Cited

U.S. PATENT DOCUMENTS

| | | | | |
|---|---|---|---|---|
| 4,734,879 | A | * | 3/1988 | Lin et al. ...................... 708/804 |
| 4,809,202 | A | * | 2/1989 | Wolfram .......................... 703/9 |
| 4,819,161 | A | * | 4/1989 | Konno et al. ................... 700/86 |
| 4,821,218 | A | * | 4/1989 | Potsch ........................ 73/514.01 |
| 4,841,479 | A | * | 6/1989 | Tsuji et al. ..................... 716/20 |
| 4,972,334 | A | * | 11/1990 | Yamabe et al. ................. 716/20 |
| 5,129,035 | A | * | 7/1992 | Saji et al. ..................... 717/106 |
| 5,249,151 | A | * | 9/1993 | Chang et al. ..................... 703/7 |
| 5,297,057 | A | * | 3/1994 | Kramer et al. ................... 703/7 |
| 5,835,693 | A | * | 11/1998 | Lynch et al. .................. 345/473 |
| 2003/0084421 | A1 | * | 5/2003 | Estevez-Schwarz et al. ... 716/20 |

OTHER PUBLICATIONS

S.L. Campbell. "Intelligent DAE Solvers and User Friendly Design, Simulation, and Analysis Packages". IEEE, 1998. vol. 4, pp. 1-6.*
Ascher et al. "Stabilization of DAEs and invariant manifolds". Nov. 15, 1994. pp. 1-18.*
Shampine et al. "The Matlab ODE Suite". Mar. 27, 1997. pp. 1-22.*
Brian D. Storey. "Solving Differential Equations with Simulink" Aug. 2002.*
Simulink: "Dynamic System Simulation for MATLAB" 1999.*

(Continued)

*Primary Examiner* — Kamini S Shah
*Assistant Examiner* — Shambhavi Patel
(74) *Attorney, Agent, or Firm* — Nelson Mullins Riley & Scarborough LLP; Kevin J. Canning; Neslihan I. Doran

(57) ABSTRACT

A modular representation of a physical system is generated using modules and variables, each module representing a portion of the physical system, each variable representing a parameter of the physical system. Code is generated according to the modular representation such that the code is suitable to be compiled into a machine code that can be executed on hardware to simulate the physical system. The code contains instructions to cause the hardware to solve a system of differential algebraic equations that represent relationships among the variables.

31 Claims, 13 Drawing Sheets

OTHER PUBLICATIONS

Sinha et al. "Kinematics Support for Design and Simulation of Mechatronic Systems" 2000.*
Symbolic Dynamics: "SD/FAST User's Manual" Version B.2 1996.*
Ascher, Uri. "Stabilization of Invariants of Discretized Differential Equations", 1996.*
Lawrence et al. "Sovling Index-1 DAEs in Matlab and Simulink" Society for Industrial and Applied Mathematics, 1999.*
Gu et al. "Co-Simulation of Coupled Dynamic Subsystems: A Differential-Algebraic Approach Using Singularly Perturbed Sliding Manifolds", Proceedings of the American Control Conference, 2000.*
Schiehlen et al. "Force Coupling Versus Differential Algebraic Description of Constrained Multibody Systems", Multibody System Dynamics 4: 317-340, 2000.*
Biegler, L. "Differential Algebraic Equations (DAEs)", May 2000.*
Gu et al. "Co-Simulation of Algebraically Coupled Dynamic Systems", Proceedings of the American Control Conference, Jun. 2001.*
Gu et al. "Co-Simulation of Coupled Dynamic Subsystems: A Differential Algebraic Approch using Singulary Perturbed Sliding Manifolds", Proceedings of the American Control Conference, Jun. 2000.*
Shampine et al. "Solving Index 1 DAEs in Matlab and Simulink", 1999.*
Lubich et al. "MEXX—Numerical Software for the Integration of Constrained Mechanical Multibody Systems," Dec. 1992.*
Matz et al. "Simulation Support by Index Computation", 15th IMACS World Congress on Scientific Computation, Modelling and Applied Mathematics, Berlin, Aug. 24-29, 1997, vol. 1 Computational Mathematics, 203-208.*
Bequette, B.W. Ordinary Differential Equations, Jan. 2001.*
Otter et al. "Modeling of Multibody Systems with the Object-Oriented Modeling Language Dymola", Nonlinear Dynamics 1996.*
Reifbig et al. "On Inconsistent Initial Conditions for Linear Time-Invariant Differential-Algebraic Equations", IEEE Transactions on Circuits and Systems, Nov. 2002.*
Shampine et al., "The MATLAB ODE Suite," SIAM J. Sci. Comp., 18, 1997, pp. 1-22.
Shampine, "Conservation Laws and the Numerical Solution of ODEs, II," Computers and Mathematics with Applications, 38, 1999, pp. 61-72.
Ascher et al., "Stabilization of DAEs and invariant manifolds," Numer. Math., 67, 1994, pp. 131-149.

* cited by examiner

SIMULATION OF CONSTRAINED SYSTEMS

TECHNICAL FIELD

This invention relates to simulation of constrained systems.

BACKGROUND

Software simulation tools allow physical systems to be studied without actually building the physical system. As an example, referring to FIG. 7, a two-dimensional physical system 204 includes a bead 200 moving on a vertically positioned wire 202 having a circular shape. System 204 can be described using equations:

$$m\ddot{x}=F_x, \quad \text{(Equ. 1)}$$

$$m\ddot{y}=F_y-mg, \quad \text{(Equ. 2)}$$

$$x^2+y^2=r^2, \quad \text{(Equ. 3)}$$

where x and y represent the coordinates of the bead, $\ddot{x}$ and $\ddot{y}$ represent the second derivative of x and y with respect to time t, respectively, m represents the mass of the bead, r represents the radius of the circle, and g represents the gravitational constant. $F_x$ and $F_y$ represent the forces exerted on bead 200 in the x and y directions, respectively. The motion of bead 200 on surface 202 can be determined by solving the equation:

$$\begin{bmatrix} m & 0 \\ 0 & m \end{bmatrix}\begin{bmatrix} \ddot{x} \\ \ddot{y} \end{bmatrix} = \begin{bmatrix} F_x \\ F_y \end{bmatrix} + 2\begin{bmatrix} x \\ y \end{bmatrix}\lambda, \quad \text{(Equ. 4)}$$

where λ is the Lagrangian multiplier. By differentiating Equ. 3 twice, we obtain $$x\ddot{x}+y\ddot{y}+\dot{x}^2+\dot{y}^2=0. \quad \text{(Equ. 5)}$$

Substituting Equs 1 and 2 into Equ. 5, we obtain $$\frac{x}{m}(F_x + 2x\lambda) + \frac{y}{m}(F_y - mg + 2y\lambda) + \dot{x}^2 + \dot{y}^2 = 0,$$

from which we obtain $$\lambda = -\frac{m(\dot{x}^2 + \dot{y}^2)}{2r^2} - \frac{xF_x}{2r^2} - \frac{y(F_y - mg)}{2r^2}. \quad \text{(Equ. 6)}$$

Using Equs. 4 and 6, we can determine the positions of bead 200 over time using a discrete integration process (i.e., the position of the bead at time $t_{n+1}$ is determined from its position at time $t_n$ by integrating differential terms).

Equs. 1-3 are said to be a set (or system) of differential algebraic equations (DAEs). In general, a system of DAEs can be written as:

$$F(x',x,y,t)=0, \quad \text{(Equ. 7)}$$

$$G(x,y,t)=0, \quad \text{(Equ. 8)}$$

where Equ. 7 represents one or more differential equations, Equ. 8 represents one or more algebraic constraints on the variables, and the Jacobian of F with respect to x' (denoted by $\partial F/\partial x'=F_{x'}$) is non-singular. By a change of variables, Equs. 7 and 8 can be rewritten into the form:

$$F(t,u(t),u'(t))=0, \quad \text{(Equ. 9)}$$

where the Jacobian of F with respect to u' ($F_{u'}$) is singular.

SUMMARY

In general, in one aspect, the invention features a method that includes generating a modular representation of a physical system using modules and variables, each module representing a portion of the physical system, each variable representing a parameter of the physical system, and generating code according to the modular representation. The code is designed to be suitable for compiling into a machine code that can be executed on hardware to simulate the system. The code contains instructions to cause the hardware to solve a system of differential algebraic equations (DAEs).

Implementations of the invention may include one or more of the following features. The system of DAEs has the form F(t, y(t), y'(t))=0, where t is a variable, y is a function of t, F is a function of t, y, and y', and the Jacobian of F with respect to y' (denoted by $\partial F/\partial y'$) is singular.

The system of DAEs includes a differential equation and an algebraic equation representing constraints on the variables.

The code contains instructions to cause the hardware to solve the DAEs using a discrete integration process.

The code contains instructions to cause the hardware to derive a first solution for the variables that satisfy the differential equation, and derive a second solution for the variables that satisfy the algebraic equation based on the first solution.

The code contains instructions to cause the hardware to derive the second solution from the first solution using an iterative process that ends when the solutions converge within a predefined threshold.

The code contains instructions to cause the hardware to derive the second solution from the first solution using a truncated iterative process that ends after a predefined number of iterative steps.

The code contains instructions to cause the hardware to derive the second solution by projecting the first solution to a constraint manifold specified by the algebraic equation.

The code contains instructions to cause the hardware to convert the system of DAEs into a system of ordinary differential equations (ODEs).

The code contains instructions to cause the hardware to add a stabilization term to the system of ODEs, the stabilization term comprising a constraint specified by the algebraic equation.

The system of ODEs has the form $\dot{x}=f(x)$, the algebraic equation can be converted into the form c(x)=0, and the stabilization term has the form $-\gamma \cdot F(x) \cdot c(x)$, where x is a variable, $\dot{x}$ is a derivative of x with respect to time, F is a function of x, and γ is a constant.

The constant $$\gamma = \frac{1}{h},$$

where h is the step size of a discrete integration process used to solve the system of ODEs.

The symbol x represents a vector comprising variables derived from variables used in the modular representation of the physical system.

The stabilization term is designed so that when a numerical integration process is used to solve the system of ODEs with the stabilization term, the solutions are stabilized compared to solutions derived using the numerical integration process to solve the system of ODEs without the stabilization term.

The stabilization term is designed to reduce drift of solutions to the system of ODEs derived when the solutions are derived using a discrete integration process.

The physical system includes multiple objects that are coupled together, a mechanical system, an electrical system, a pneumatic system, or a hydraulic system A portion of the modular representation represents chemical reactions or fluid dynamics.

The method further includes compiling the code to generate the machine code.

The method further includes executing the machine code on the hardware.

One of the variables represents an input of the physical system, one of the variables represents an output of the physical system, and one of the variables represents a state of the physical system.

The system of DAEs includes a term representing a derivative of one of the variables with respect to time.

In general, in another aspect, the invention features a method that includes using a computer to generate code according to a modular representation of a physical system. The modular representation includes modules and variables, each module representing a portion of the physical system, each variable representing a parameter of the physical system. The code is designed to be suitable for compiling into a machine code that can be executed on hardware to simulate the physical system. The code contains instructions to cause the hardware to derive solutions for the variables that satisfy a system of differential algebraic equations (DAEs) that represents relationships among the variables.

Implementations of the invention may include one or more of the following features.

The code includes a functional call to a first subroutine that contains instructions to cause the hardware to derive the solutions to the system of DAEs using a projection process.

The code includes a functional call to a second subroutine that contains instructions to cause the hardware to derive the solutions to the system of DAEs using a stabilization process.

The first and second subroutines are substantially the same independent of changes in the physical system.

The second subroutine contains instructions that cause the hardware to convert the system of DAEs to a system of ordinary differential equations (ODEs), to incorporate a stabilization term to the system of ODEs, and to solve the system of ODEs with the stabilization term using a discrete integration process.

In general, in another aspect, the invention features a method that includes generating code to simulate a physical system in real time by solving a system of differential algebraic equations (DAEs).

Implementations of the invention may include one or more of the following features.

The code includes source code that is suitable to be compiled into a machine code that can be executed on hardware.

The code includes instructions to cause hardware to convert the system of DAEs to a system of ordinary differential equations (ODEs) and to solve the system of ODEs using a discrete integration process.

The code includes instructions to cause the hardware to implement a projection process to reduce drift generated in the discrete integration process.

The projection process includes a truncated iterative process that stops after a predetermined number of iterations.

The code includes instructions to cause the hardware to add a stabilization term to the system of ODEs to generate a system of modified ODEs, and to solve the system of modified ODEs.

The stabilization term is based on an algebraic constraint specified in the system of DAEs.

In general, in another aspect, the invention features a method that includes generating code to simulate a physical system in real time by solving a system of ordinary differential equations using a discrete integration process and a truncated projection process.

In general, in another aspect, the invention features a method that includes generating code to simulate a physical system in real time by solving a system of ordinary differential equations (ODEs), includes incorporating a stabilization term into the system ODEs to generate a system of modified ODEs, and solving the modified ODEs by using a discrete integration process.

In general, in another aspect, the invention features an apparatus that includes a graphical user interface (GUI) to allow a user to generate a modular representation of a physical system using modules and variables, each module representing a portion of the physical system, each variable representing a parameter of the physical system, and a code generator to generate code according to the modular representation. The code is designed to be suitable for compiling into a machine code that can be executed on hardware to simulate the physical system. The code contains instructions to cause the hardware to solve a system of differential algebraic equations (DAEs) that represents relationships among the variables.

Implementations of the invention may include one or more of the following features.

The GUI provides a functionality to allow specific values to be assigned to one or more variables.

The GUI provides modules to construct a model of a mechanical system. The code includes source code written in C programming language.

The apparatus further includes the hardware used to simulate the system.

The hardware includes a microprocessor or a microcontroller.

In general, in another aspect, the invention features an apparatus that includes a graphical user interface (GUI) to allow a user to generate code to simulate in real time a physical system by solving a system of differential algebraic equations.

Implementations of the invention may include one or more of the following features.

The GUI provides a functionality to allow the user to select one of a projection process and a stabilization process to be used in solving the system of DAEs.

In general, in another aspect, the invention features a computer program product, tangibly stored on a computer-readable medium, for simulating a physical system. The computer program produce includes instructions operable to cause a programmable processor to generate a modular representation of the physical system using modules and variables, each module representing a portion of the physical system, each variable representing a parameter of the physical system, and generate code according to the modular representation. The code is designed to be suitable for compiling into a machine code that can be executed on hardware to simulate the physical system. The code contains instructions to cause the hardware to solve a system of differential algebraic equations used to represent relationships among the variables.

In general, in another aspect, the invention features a computer program product, tangibly stored on a computer-readable medium, for simulating a physical system in real time, includes instructions operable to cause a programmable processor to generate code to simulate the physical system in real time by solving a system of differential algebraic equations.

In general, in another aspect, the invention features an apparatus that includes a computer-readable storage medium tangibly embodying program instructions for simulating a physical system. The program instructions includes instructions operable to cause a programmable processor to generate a modular representation of a physical system using modules and variables, each module representing a portion of the physical system, each variable representing a parameter of the physical system, and generate code according to the modular representation. The code suitable to be compiled into a machine code that can be executed on hardware to simulate the physical system. The code contains instructions to cause the hardware to solve a system of differential algebraic equations used to represent relationships among the variables.

In general, in another aspect, the invention features an apparatus that includes a computer-readable storage medium tangibly embodying program instructions for simulating a physical system in real time. The program instructions includes instructions operable to cause a programmable processor to generate code to simulate a physical system in real time by solving a system of differential algebraic equations.

In general, in another aspect, the invention features a graphical user interface that includes a first interface to display a modular representation of a physical system using modules and variables, each module representing a portion of the physical system, each variable representing a parameter of the physical system, and a second interface to display a code that is generated according to the modular representation. The code is designed to be suitable for compiling into a machine code that can be executed on hardware to simulate the physical system. The code contains instructions to cause the hardware to solve a system of differential algebraic equations representing relationships among the variables.

In general, in another aspect, the invention features a graphical user interface that includes an interface to display a code suitable to be compiled into a machine code that can be executed on hardware to simulate a physical system in real time by solving a system of differential algebraic equations.

In general, in another aspect, the invention features a computer program, tangibly stored on a computer-readable medium, that includes instructions for causing a computer having a display to display a modular representation of a physical system using modules and variables, each module representing a portion of the physical system, each variable representing a parameter of the physical system, and display a code that is generated according to the modular representation. The code is designed to be suitable for compiling into a machine code that can be executed on hardware to simulate the physical system. The code contains instructions to cause the hardware to solve a system of differential algebraic equations representing relationships among the variables.

In general, in another aspect, the invention features a computer program, tangibly stored on a computer-readable medium, including instructions for causing a computer having a display to display a code suitable to be compiled into a machine code that can be executed on hardware to simulate a physical system in real time by solving a system of differential algebraic equations.

Other features and advantages of the invention will be apparent from the description and drawings, and from the claims.

DETAILED DESCRIPTION

Figure 1:
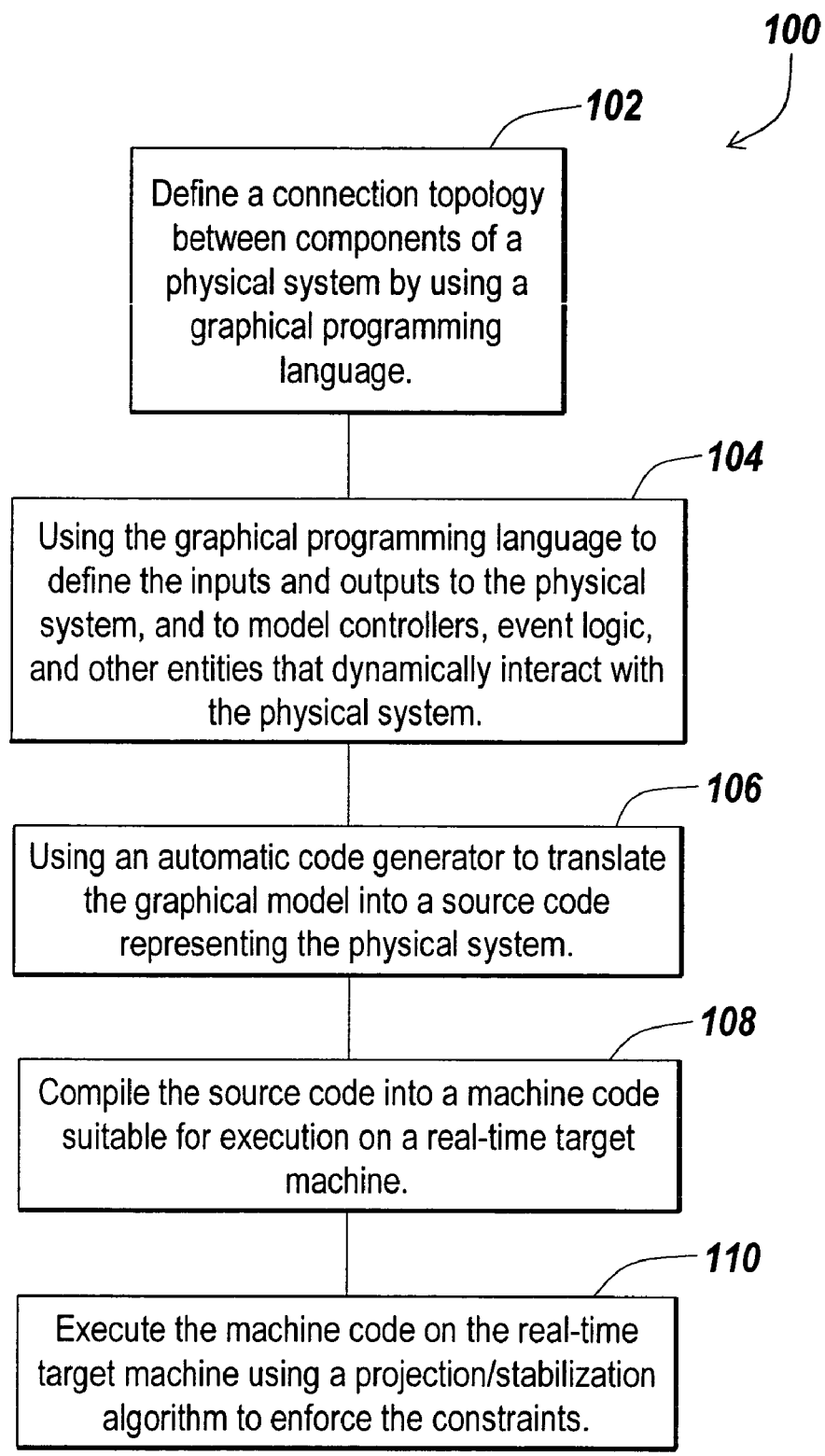
FIGS. 1 and 8 are flow diagrams.

Referring to FIG. 1, a process 100 allows a user to construct models of physical systems in a graphical environment for the purpose of execution on real-time hardware. Projection and stabilization algorithms used in solving DAEs that represent the physical systems are incorporated into automatically generated code to allow the DAEs to be solved in a real-time setting.

Process 100 includes defining (102) a connection topology between components of a physical system by using a graphical programming language, such as Simulink® tool, available from The MathWorks, Inc., Natick, Mass. Mechanical components of the physical system can be modeled using Sim-Mechanics® tool, also available from The MathWorks Inc. The connection topology is described by a system of DAEs that include one or more algebraic equations representing constraints on the physical system. The graphical programming language is used to define (104) the inputs and outputs to the physical system, to model controllers, event logic, and other entities that dynamically interact with the physical system.

An automatic code generator is used to translate (106) the graphical model into a source code representing the physical system. An example of the automatic code generator is Real-Time Workshop® tool, available from The MathWorks Inc. The source code can be, for example, written in the C programming language.

The source code contains instructions to convert the system of DAEs to a system of ODEs, and instructions to solve the system of ODEs using a discrete integration process. To prevent drift due to round-off errors, the user can select to use a stabilization process or a projection process. Appropriate function calls are incorporated into the automatically generated source code so that projection or stabilization processes are called at the appropriate time when solving the ODEs. The automatically inserted projection or stabilization code is not problem specific, does not depend on the system to be simulated, and does not depend on the discretization method used in solving the ODEs.

The stabilization process has the advantage of being deterministic and allows the DAEs to be solved in a predetermined amount of time, which is appropriate for real-time applications. The disadvantage is that it does not provide strict bounds on constraint violation. The projection process has the advantage that constraints are satisfied to within a user-specified tolerance. The projection process is iterative, the estimated solutions may not converge in a predetermined amount of time, and thus may not be ideal for real-time applications. The projection process can be made applicable to a real-time setting if the number of iterations is restricted to a predetermined number. Such a projection process will be called a "truncated projection process." A truncated projection process will not provide strict bounds on constraint violation.

The term "real-time simulation" means that if a physical system is simulated over a period of time, the amount of time used to conduct the simulation is the same as the period of time being simulated. For example, if the movement of bead 200 from time t=0 to time t=2 seconds is simulated in real-time using 0.05 second intervals, the positions of bead 200 have to be determined by solving Equs. 1-3 every 0.05 second, for a period of 2 seconds.

For real-time simulations, the automatic code generator allows the user to choose between code that implements the truncated projection process and code that implements the stabilization process. For non real-time simulations, the automatic code generator allows the user to choose between code that implements the projection process and code that implements the stabilization process.

The resulting source code is compiled (108) to generate a machine code suitable for execution on a real-time machine, such as xPC TargetBox®, available from The MathWorks Inc. The machine code is executed (110) on the real-time machine using the projection/stabilization algorithm to enforce the constraints. The real-time machine is used in a "hardware in the loop" simulation in which the real-time machine simulates a physical system that is part of an overall system, where the real-time machine receives input from and generates output to other components of the overall system.

An advantage of using process 100 is that, by using the truncated-projection or stabilization process, a physical system described by DAEs can be modeled by a machine in real time. Simulating a physical system described by DAEs on a real-time machine requires the machine to solve nonlinear equations at every time step. For example, to simulate the movements of a physical system from 0 to 60 seconds using 1 ms time steps, it is necessary to solve nonlinear equations every 1 ms. When DAEs are solved without the truncated-projection or stabilization process, the solution to the DAEs at a particular time step may not be obtained within 1 ms, making such methods inapplicable to real-time machines. Use of truncated-projection or stabilization process allows source code to be generated such that when the source code is compiled and executed on the real-time machine, the DAEs can be solved within the 1 ms limit.

Simulating physical systems in real-time is useful for virtual prototyping, controller testing, and validation. Modeling tools that can generate code automatically from graphical models of the physical system allow simulation of the physical systems to be achieved more efficiently.

Figure 8:
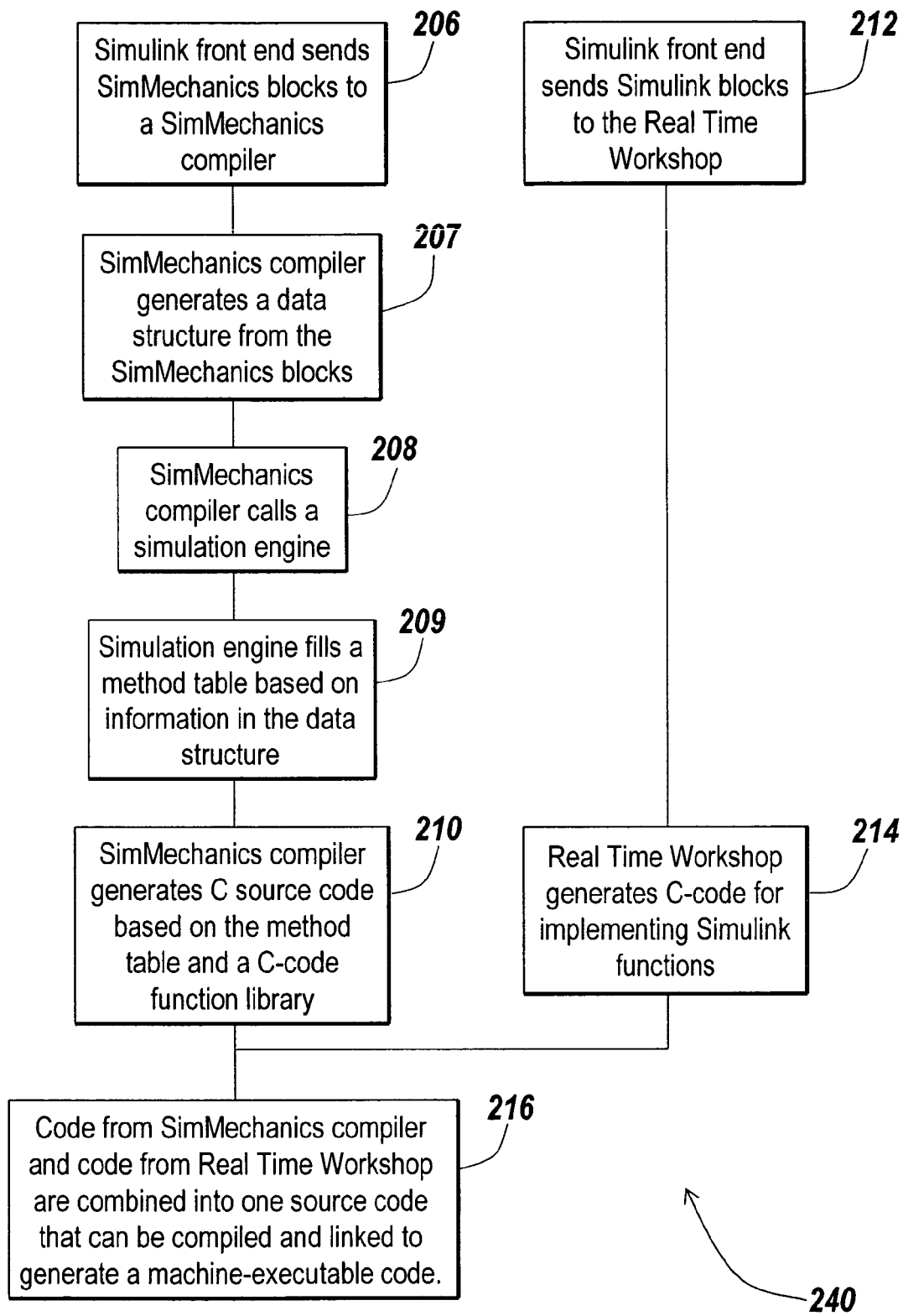
Figure 9:
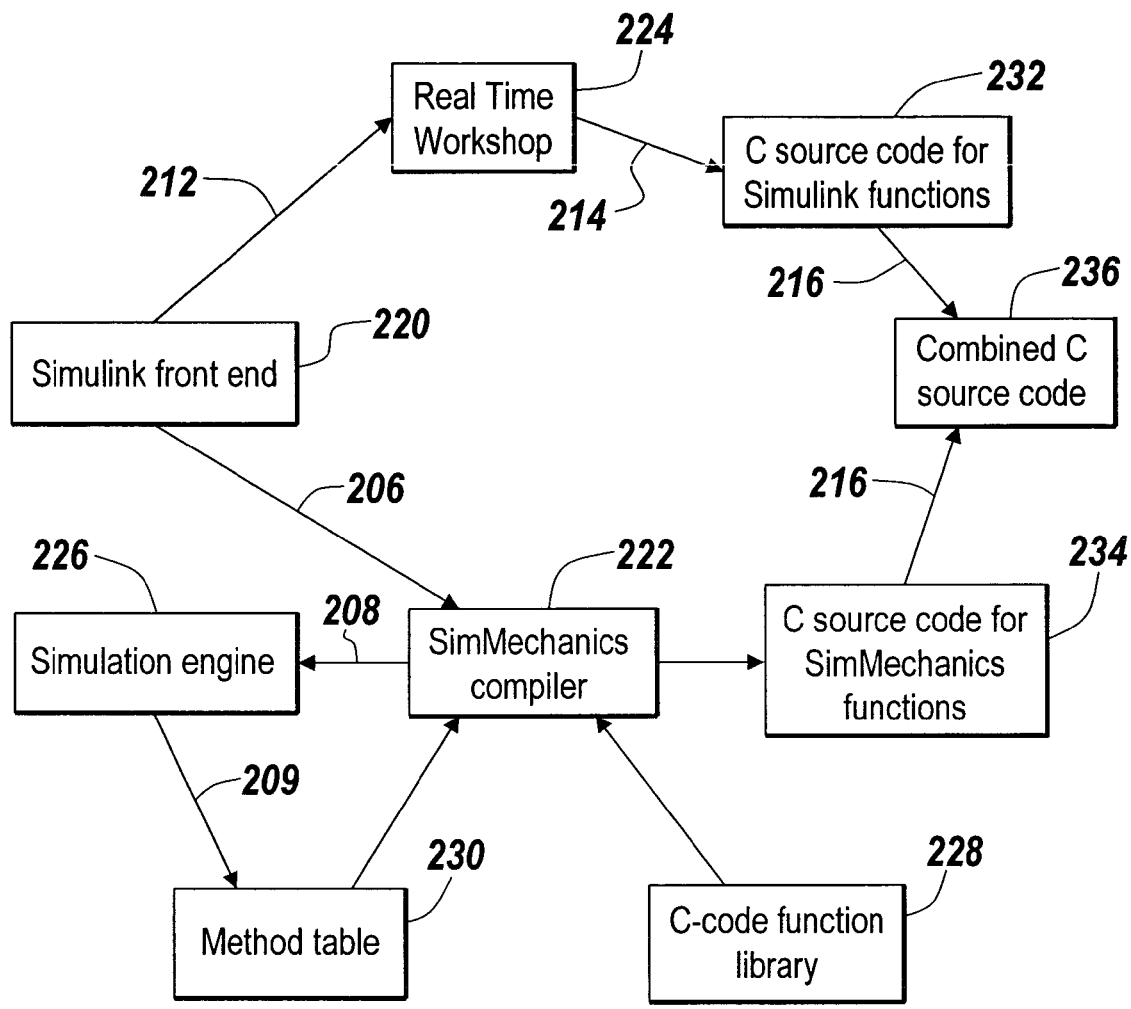
FIG. 9 shows a block diagram.

Referring to FIGS. 8 and 9, a process 240 illustrates how a source code for simulating a physical model is automatically generated from a graphical model using Simulink, SimMechanics, and Real-time Workshop. After a graphical model of a physical system is established using SimMechanics blocks, a Simulink front end 220 sends (206) the SimMechanics blocks to a SimMechanics compiler 222.

Compiler 206 generates (207) a data structure from the SimMechanics blocks, the data structure representing connection of the modules and actions that need to be performed on the modules. Compiler 222 calls (208) a simulation engine 226, passing the data structure to simulation engine 226. Each SimMechanics block may correspond to a number of methods (or functions). Based on the information in the data structure, simulation engine 226 determines which methods are actually required to simulate the physical system, and fills (209) a method table 230 specifying the required methods.

Information related to the user's choice of constraint method (whether to use a stabilization process, a projection process, or a truncated projection process in the simulation) is passed from the Simulink front end 220 to SimMechanics compiler 222 and to simulation engine 226. One entry in the method table specifies whether a stabilization process, a projection process, or a truncated projection process is used.

Based on the method table 230 and a C-code function library 228, compiler 222 generates (210) C source code 234 that implements the functions of SimMechanics blocks. C source code 234 includes the name of the C file in library 228 used to implement the methods specified in the method table 230.

In addition to sending SimMechanics blocks to compiler 222, Simulink front end 220 sends (212) information related to Simulink functions to Real-Time Workshop 224, which generates (214) C source code (232) for implementing Simulink functions. The C source code for implementing the Simulink and SimMechanics functions are combined (216) to generate a combined C source code 236. Source code 236 can be compiled and linked with the function files in library 228 to generate a machine code that can be executed in a target processor, such as the xPC Target Box.

The following describes methods for solving DAEs, which are often more difficult to solve than ordinary differential equations (ODEs). Commercially available numerical solvers for dealing directly with DAEs are implicit solvers. Implicit solvers are not suitable for real-time applications since they require the solution of nonlinear systems of equations at each (discrete) time step. Numerical solution of nonlinear equations uses an iterative process, so that the number of floating-point operations required for convergence cannot be predicted a-priori. In real-time applications, the iterations must converge in a predetermined number of floating-point operations, which depends on the sampling rate and processor speed.

The index of a system of DAEs is the number of times the constraints need to be differentiated to convert the DAEs into a system of ODEs. The process of explicitly differentiating the constraints, and reducing the index of a system of DAEs to obtain a system of ODEs is known as "index reduction." While index reduction allows the DAEs to be converted into ODEs, which are more suitable for solution in real-time, the solution of the resulting ODEs is likely to violate the original constraints because of errors that build up during the numerical integration process. This is commonly called "drift." This causes problems in real-time applications, where the ODEs are solved without error control. This problem also arises when using variable step solvers in non real-time applications.

Physical systems constrained by physical conservation laws often give rise to mathematical representations in the form of "higher index DAEs," which usually refer to systems that are represented by DAEs having an index of 2 or higher. For example, certain classes of mechanical systems can only be represented by index-3 DAEs. The problem of "drift" in these systems can be alleviated using two approaches.

A first approach, called "projection," involves projecting the solution onto the constraint at the end of each iteration in the numerical integration process. The projection is terminated when the constraints are satisfied according to some convergence criterion. Using this approach, the number of iterations that are required for the solution to satisfy the constraints is not deterministic.

A second approach, called "stabilization," involves modifying the ODEs generated from index reduction of the original DAEs. Terms that vanish when the constraint is satisfied are added to the ODEs to make the constraint "attractive." The numerical solution will drift from the constraint but the constraint will pull the solution back. Using stabilization methods, although it may not be possible to determine a-priori the degree of constraint violation, it is possible to determine a-priori the computational cost (number of iterations that need to be performed, or the number of instructions that need to be executed by a processor). Thus, stabilization methods are better suitable to real-time applications.

The following describes a stabilization approach that does not require parameters to be chosen in advance, and thus is suitable for automatically generating code from a graphical modeling language. The stabilization process is closely related to a projection process that is terminated in a finite number of iterations.

Coordinate Projection

The following describes a general approach to using coordinate projection in solving DAEs. The approach is not restricted to real-time applications. Coordinate projection involves the numerical discretization of ODEs where the states must satisfy constraints. At the end of the discretization step, the solution is projected onto a constraint manifold representing the constraints.

As an illustration, the following is a projection approach appropriate for a one-step method, used to compute an approximate solution at time $t_{n+1}$ from a solution at $t_n$. The step size is h, and $t_{n+1}=t_n+h$. The explicit numerical integration step takes the form:

$$x^*_{n+1}=h\cdot\Phi(t_n,x_n) \tag{Equ. 10}$$

where $t_n$ is the time, $x_n$ is the state at the n-th time-step $t_n$, and $x^*_{n+1}$ is the predicted state at the (n+1)th time step $t_{n+1}$. If we consider the nonlinear state constraint $c(x,t)=0$, the predicted position variables $x^*_{n+1}$ are projected onto the closest point on the manifold, denoted by $x_{n+1}$. How close the projection is depends on the metric and the weighting; if weights are used in ODE error estimation, the same weights are often used in the projection scheme.

Linearizing the constraints about the predicted value $x^*_{n+1}$ gives $$0 = c(t_{n+1}, x_{n+1}) = c(t_{n+1}, x^*_{n+1}) + \tag{Equ. 11}$$
$$\frac{\partial c}{\partial x}(t_{n+1}, x^*_{n+1})(x_{n+1}, x^*_{n+1}) + O(\|x_{n+1} - x^*_{n+1}\|^2)$$

To leading order, the projected solution $x_{n+1}$ is obtained by solving $$\frac{\partial c}{\partial x}\delta = c \tag{Equ. 12}$$

$$x_{n+1}=x^*_{n+1}-\delta. \tag{Equ. 13}$$

If the Euclidean norm is used, $$\delta = \left(\frac{\partial c^T}{\partial x}\frac{\partial c}{\partial x}\right)^{-1} c. \tag{Equ. 14}$$

The projection process is repeated (and so is referred to as sequential projection) until a suitable level of convergence is obtained. This is more efficient than forming a full set of Karush-Kuhn-Tucker (KKT) equations to determine the exact minimization on the manifold. Error control in the integration process causes the predicted solution $x^*_{n+1}$ to be close to the manifold. It is advantageous to perform the projection in a weighted norm. The projection weights reflect the weights used in the error control of the ODE solver.

Stabilization

The following describes a general approach to using a stabilization process in solving DAEs. This technique is suited to the generation of stand-alone code for simulation and deployment on rapid prototyping systems with the Real-Time Workshop® tool. Consider a set of constrained ODEs (perhaps the result of index reduction applied to DAEs):

$$\dot{x}=\hat{f}(x), \tag{Equ. 15}$$

$$0=c(x). \tag{Equ. 16}$$

For example, U. Ascher, H. Chin, "Stabilization of DAEs and invariant manifolds," Numer. Math., 67, 1994, pp. 131-149, describes a family of stabilization processes that use equations having the form:

$$\dot{x}=\hat{f}(x)-\gamma F(x)c(x), \tag{Equ. 17}$$

where $\gamma>0$ is a parameter, and $$F = D(CD)^{-1} \text{ and } C(x) = \frac{\partial c}{\partial x}, \tag{Equ. 18}$$

and $D(x)$ is chosen such that C D is nonsingular. For example, if C has full row rank, D can be taken as $C^T$. Although the scheme depends on the parameter $\gamma$, an explicit discretization of the ODE and an implicit discretization of the stabilizing term $F(x)\,c(x)$ leads to an optimal choice of $$\gamma = \frac{1}{h},$$

where h is the step size. Considering the explicit discretization scheme for the ODE:

$$x^*_{n+1}=h\cdot\Phi(t_n,x_n), \tag{Equ. 19}$$

the update is given by $$\tilde{x}_{n+1}=h\cdot\Phi(t_n,x_n), \tag{Equ. 20}$$

$$x_{n+1}=\tilde{x}_{n+1}-h\gamma\cdot F(\tilde{x}_{n+1})h(\tilde{x}_{n+1}). \tag{Equ. 21}$$

When $$\gamma = \frac{1}{h},$$

the constraints become an asymptotically stable invariant manifold of the discretization scheme.

Figure 7:
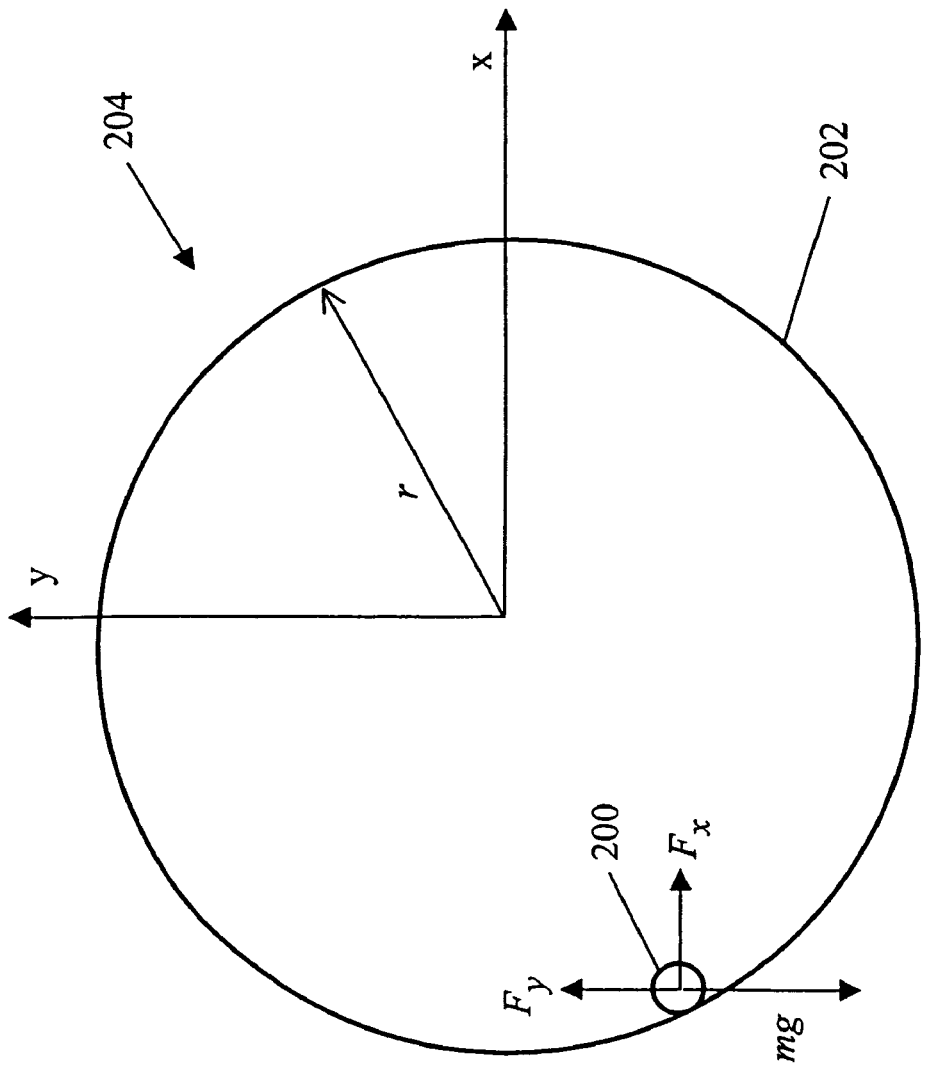
FIG. 7 shows a bead and wire system.

The following uses the bead and wire system 204 of FIG. 7 as an example to show how a stabilization term $-\gamma F\,c$ can be derived. System 204 is represented by Equs. 1-4. Let $x_1=x$, $x_2=y$, $x_3=\dot{x}$, and $x_4=\dot{y}$, we have $$\begin{bmatrix} \dot{x}_1 \\ \dot{x}_2 \\ \dot{x}_3 \\ \dot{x}_4 \end{bmatrix} = \begin{bmatrix} x_3 \\ x_4 \\ \dfrac{F_x + 2x\lambda(x,y,\dot{x},\dot{y})}{m} \\ \dfrac{F_y - mg + 2y\lambda(x,y,\dot{x},\dot{y})}{m} \end{bmatrix}. \tag{Equ. 22}$$

(note that F, unlike $F_x$ and $F_y$, does not represent force). Set $$\gamma = \frac{1}{h}, \qquad \text{(Equ. 22)}$$

where h is the step size.

The symbol c represents the constraint on the variables:

$$c = \begin{bmatrix} x^2 + y^2 - r^2 \\ 2x\dot{x} + 2y\dot{y} \end{bmatrix}. \qquad \text{(Equ. 23)}$$

Let $$z = \begin{bmatrix} x \\ y \\ \dot{x} \\ \dot{y} \end{bmatrix}, \qquad \text{(Equ. 24)}$$

then $$C = \frac{\partial c}{\partial z} = \begin{bmatrix} 2x & 2y & 0 & 0 \\ 2\dot{x} & 2\dot{y} & 2x & 2y \end{bmatrix}, \qquad \text{(Equ. 25)}$$

$$D = \begin{bmatrix} 2x & 0 \\ 2y & 0 \\ 0 & 2x \\ 0 & 2y \end{bmatrix}, \qquad \text{(Equ. 26)}$$

$$CD = 4\begin{bmatrix} x^2 + y^2 & 0 \\ x\dot{x} + y\dot{y} & x^2 + y^2 \end{bmatrix}, \qquad \text{(Equ. 27)}$$

$$(CD)^{-1} = \frac{1}{4}\begin{bmatrix} \frac{1}{x^2+y^2} & 0 \\ \frac{-(x\dot{x}+y\dot{y})}{(x^2+y^2)^2} & \frac{1}{x^2+y^2} \end{bmatrix}, \qquad \text{(Equ. 28)}$$

$$F = D(CD)^{-1} = \frac{1}{2}\begin{bmatrix} x & 0 \\ y & 0 \\ 0 & x \\ 0 & y \end{bmatrix}\begin{bmatrix} \frac{1}{x^2+y^2} & 0 \\ \frac{-(x\dot{x}+y\dot{y})}{(x^2+y^2)^2} & \frac{1}{x^2+y^2} \end{bmatrix} \qquad \text{(Equ. 29)}$$

$$= \frac{1}{2}\begin{bmatrix} \frac{x}{x^2+y^2} & 0 \\ \frac{y}{x^2+y^2} & 0 \\ \frac{-x(x\dot{x}+y\dot{y})}{(x^2+y^2)^2} & \frac{x}{x^2+y^2} \\ \frac{-y(x\dot{x}+y\dot{y})}{(x^2+y^2)^2} & \frac{y}{x^2+y^2} \end{bmatrix}. \qquad \text{(Equ. 30)}$$

The equation $$\begin{bmatrix} \dot{x}_1 \\ \dot{x}_2 \\ \dot{x}_3 \\ \dot{x}_4 \end{bmatrix} = \begin{bmatrix} x_3 \\ x_4 \\ \frac{F_x + 2x\lambda(x, y, \dot{x}, \dot{y})}{m} \\ \frac{F_y - mg + 2y\lambda(x, y, \dot{x}, \dot{y})}{m} \end{bmatrix} - \qquad \text{(Equ. 31)}$$

-continued $$\frac{1}{2h}\begin{bmatrix} \frac{x}{x^2+y^2} & 0 \\ \frac{y}{x^2+y^2} & 0 \\ \frac{-x(x\dot{x}+y\dot{y})}{(x^2+y^2)^2} & \frac{x}{x^2+y^2} \\ \frac{-y(x\dot{x}+y\dot{y})}{(x^2+y^2)^2} & \frac{y}{x^2+y^2} \end{bmatrix}\begin{bmatrix} x^2 + y^2 - r^2 \\ 2x\dot{x} + 2y\dot{y} \end{bmatrix}$$

can be solved using an ODE solver that implements a discrete integration process.

Figure 10:
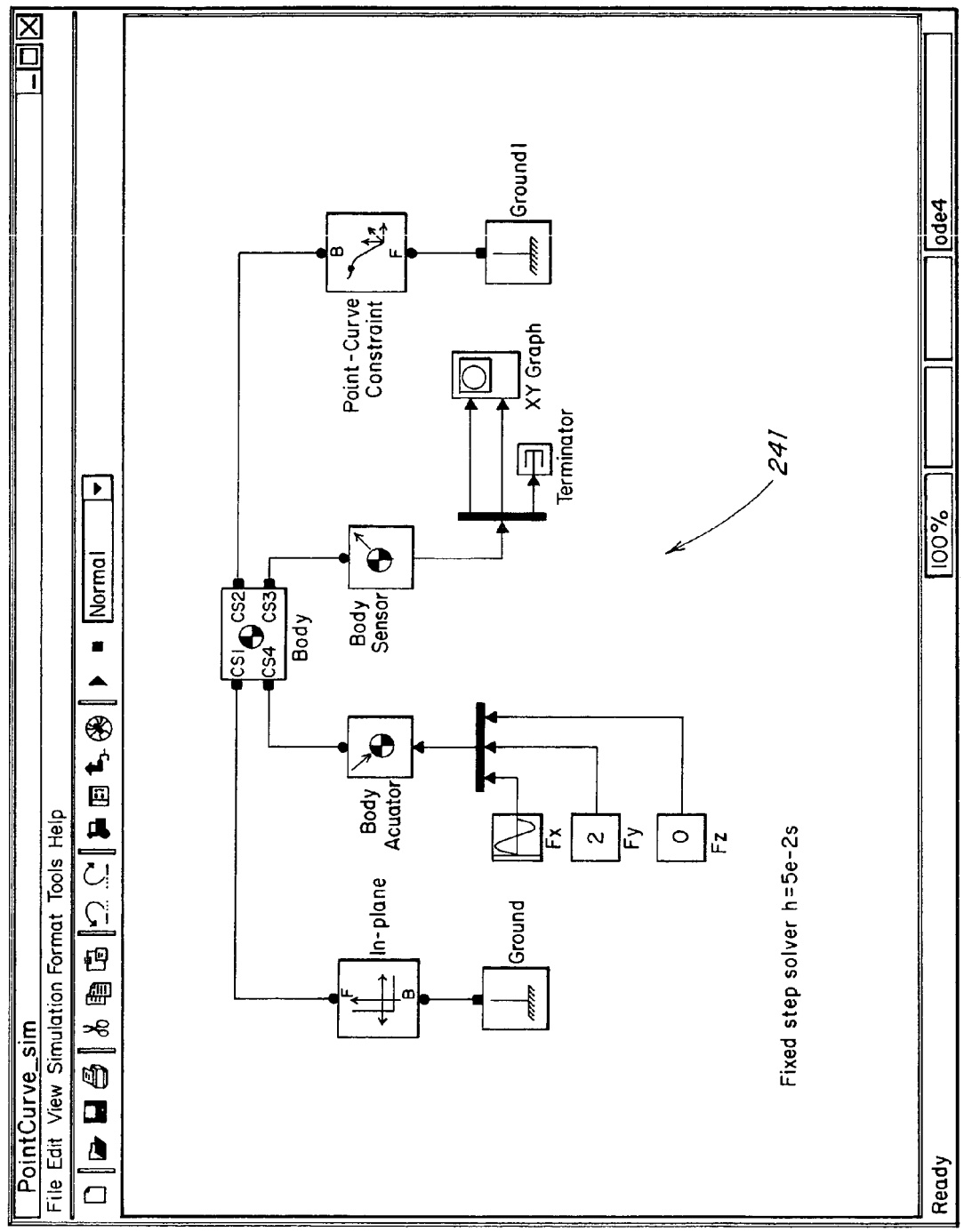
FIGS. 10 and 12 show models for simulating the bead and wire system.
Figure 11:
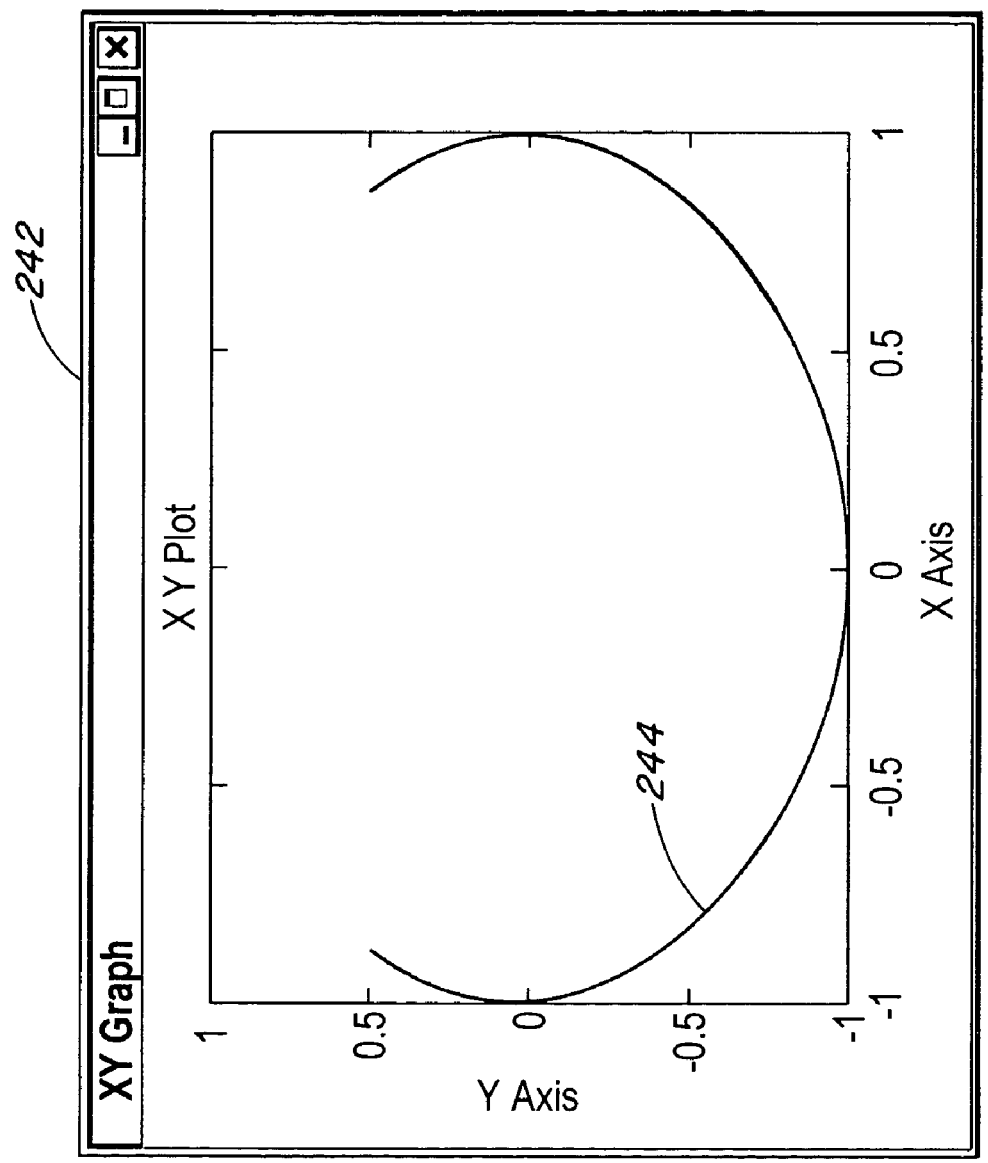
FIGS. 11 and 13 show trajectories of the bead.

As an illustration, FIG. 10 shows a model 241 of the bead and wire system 204. In running the simulation based on model 241, the simulation tool solves Equ. 31 using a discrete integration process. FIG. 11 is a graph 242 that shows a real-time trajectory 244 of beam 200 generated from the simulation. The trajectory substantially conforms to the circular shaped of wire 202.

Figure 12:
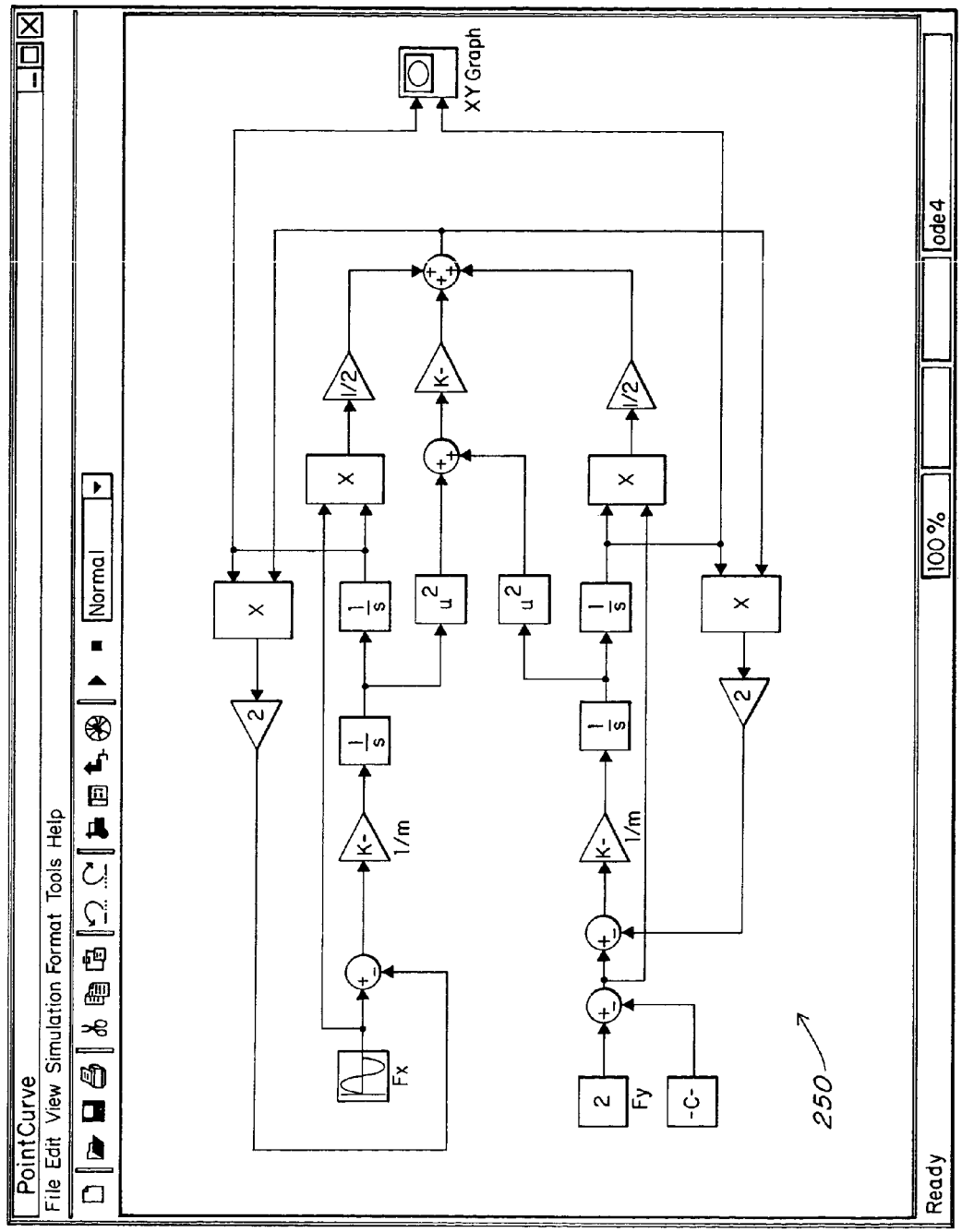
Figure 13:
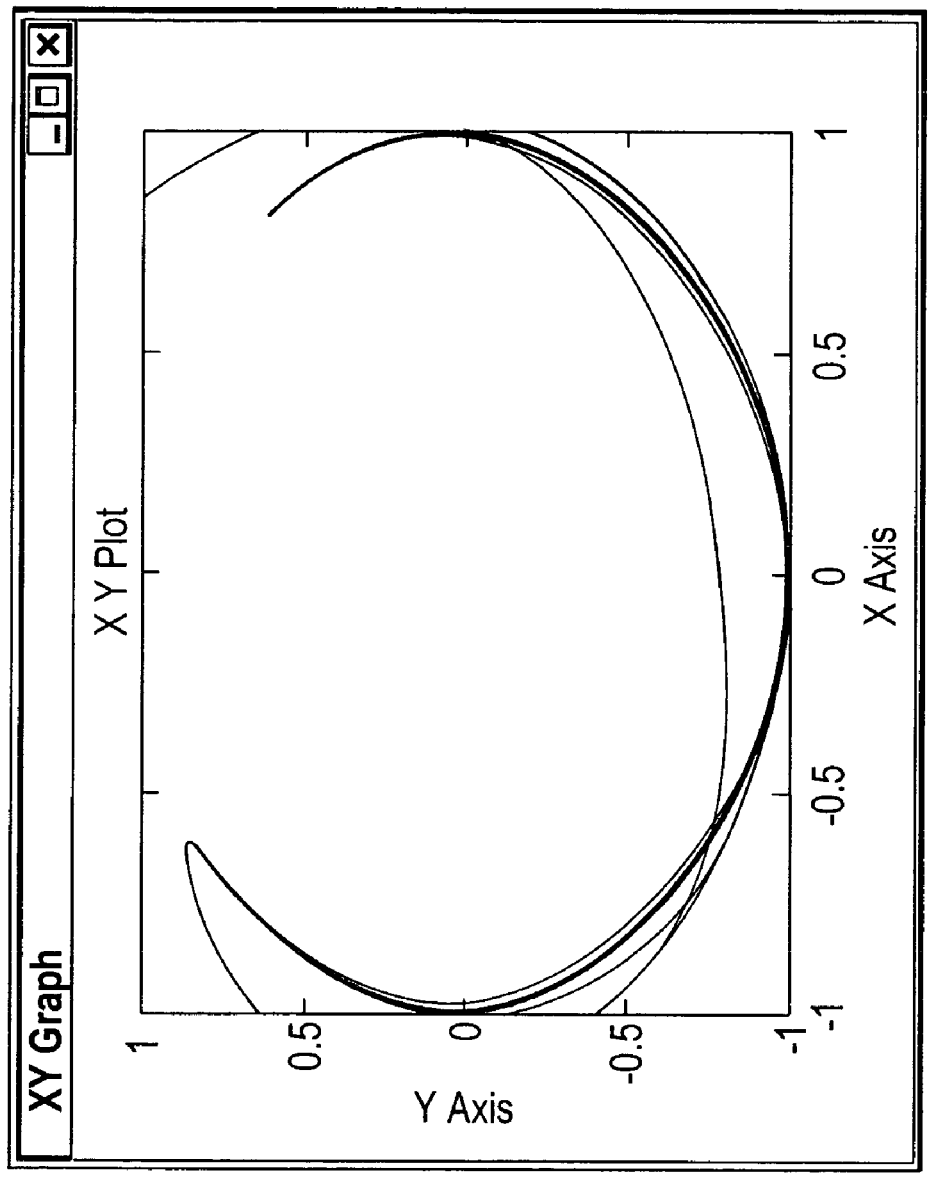

For comparison, FIG. 12 shows a model 250 used to solve Equs 1-3 without the stabilization or the projection process. FIG. 13 is a graph 252 that shows a trajectory 254 of bead 200 that is generated from a simulation according to model 250. Because of the finite precision of the computer used to carry out the simulation, round-off errors cause the simulated trajectory 254 to deviate from wire 202 over time. The longer the simulation time, the greater the accumulated round-off errors, and the greater the deviation.

Using a GUI to Model a Physical System

In the following, a conveyor belt system is used as an example to show how a model of a physical system can be established.

Figure 2:
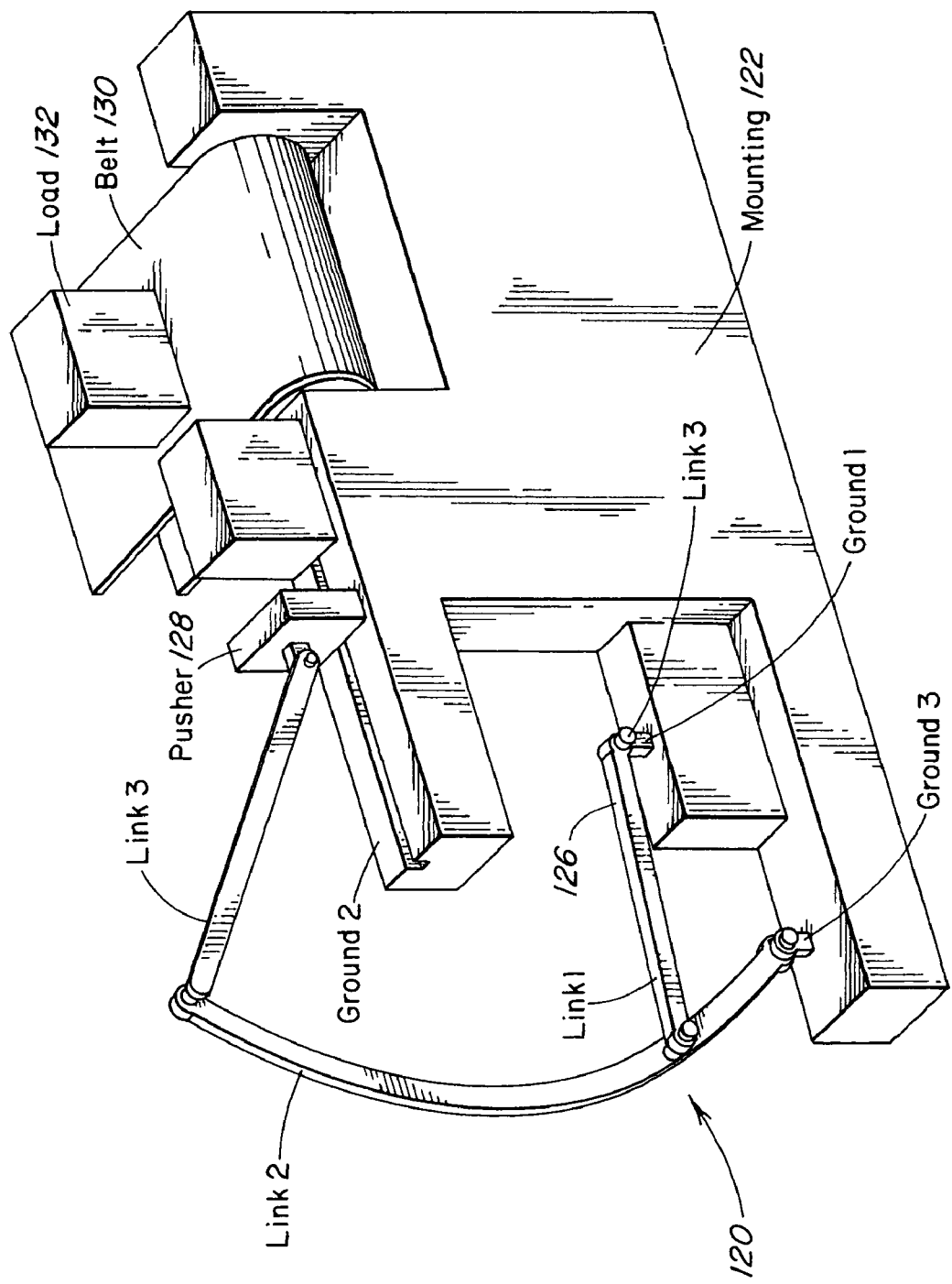
FIG. 2 shows a conveyor belt system.

Referring to FIG. 2, a conveyor belt system 120 includes a mounting 122 that supports, among other elements, links (e.g., 126), a pusher 128, and a belt 130. Pusher 128 pushes a load (e.g., 132) onto the belt 130, which then carries the load away.

Figure 3:
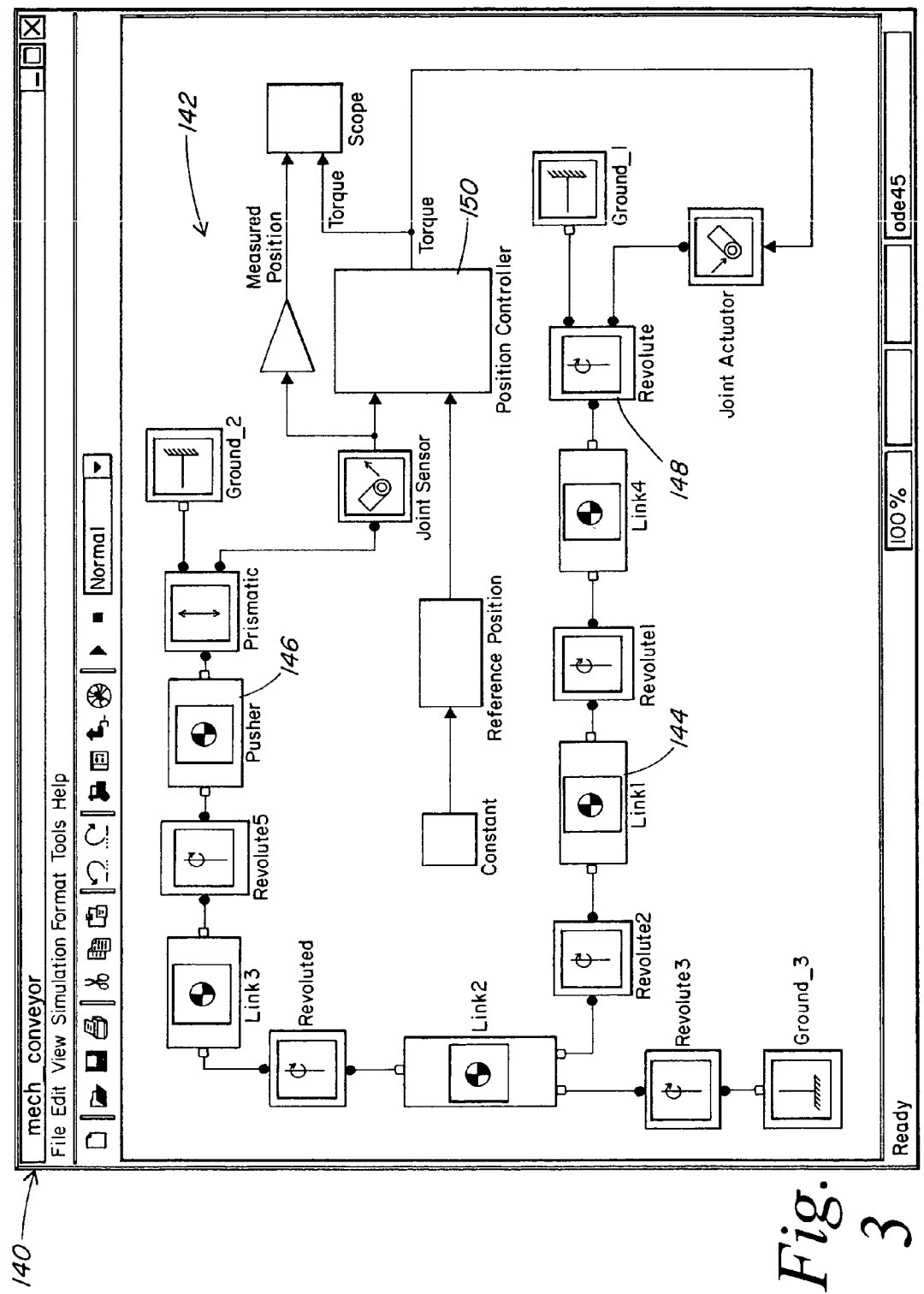
FIG. 3 shows a graphical user interface (GUI) for creating a model of the physical system.
Figure 4:
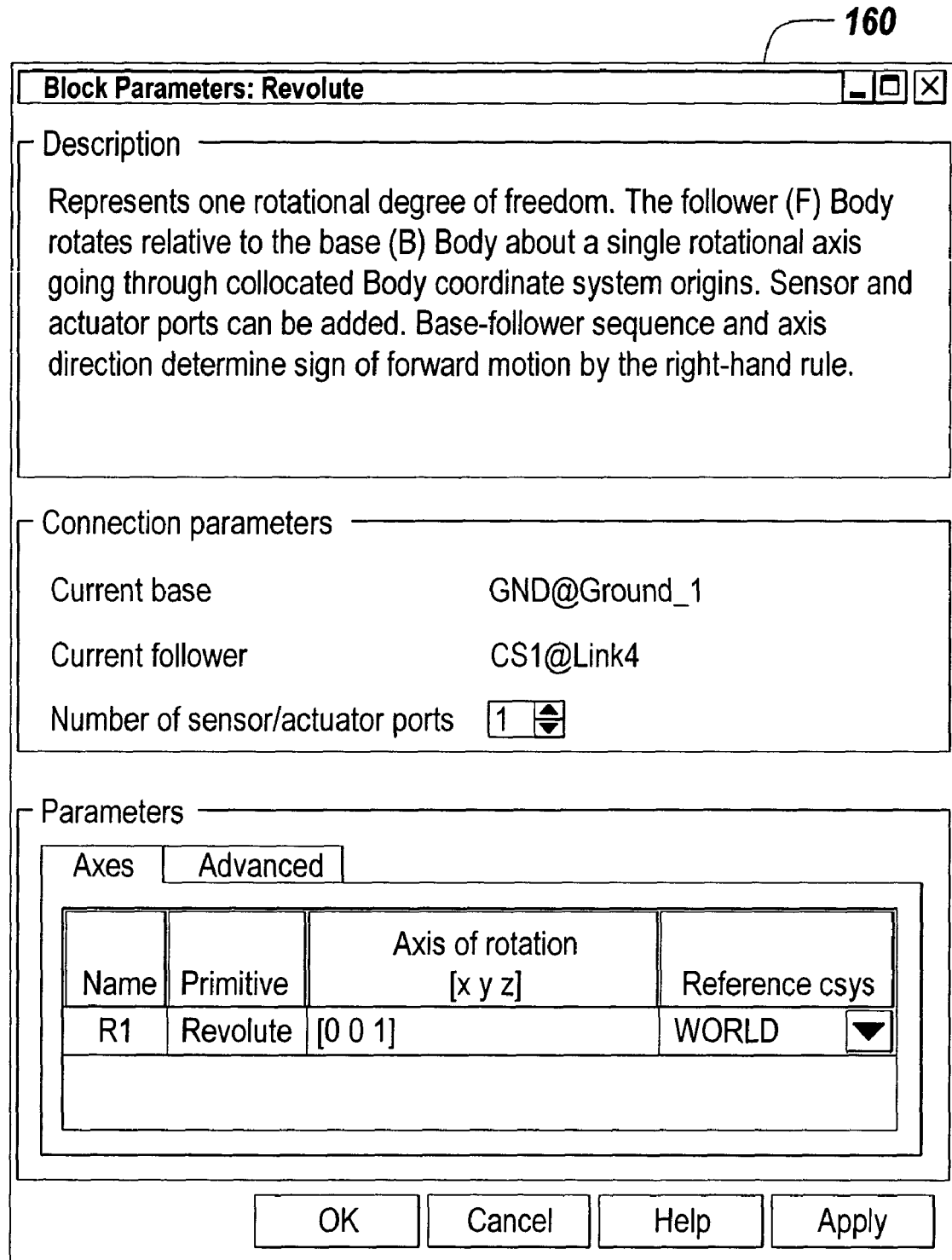
FIGS. 4 and 5 show GUIs for adjusting parameters of the model.

Referring to FIG. 3, a graphical user interface (GUI) 140 allows a user to establish a model 142 of the conveyor belt 120 by using blocks, such as "Link 1" 144 and "Pusher" 146 (which correspond to Link 1 126 and Pusher 128 in FIG. 2, respectively). Each block in model 142 represents a portion of the conveyor belt system, and may have various attributes. For example, referring to FIG. 4, a GUI 160 allows a user to adjust the properties of a block "Revolute" 148 in FIG. 3.

Figure 5:
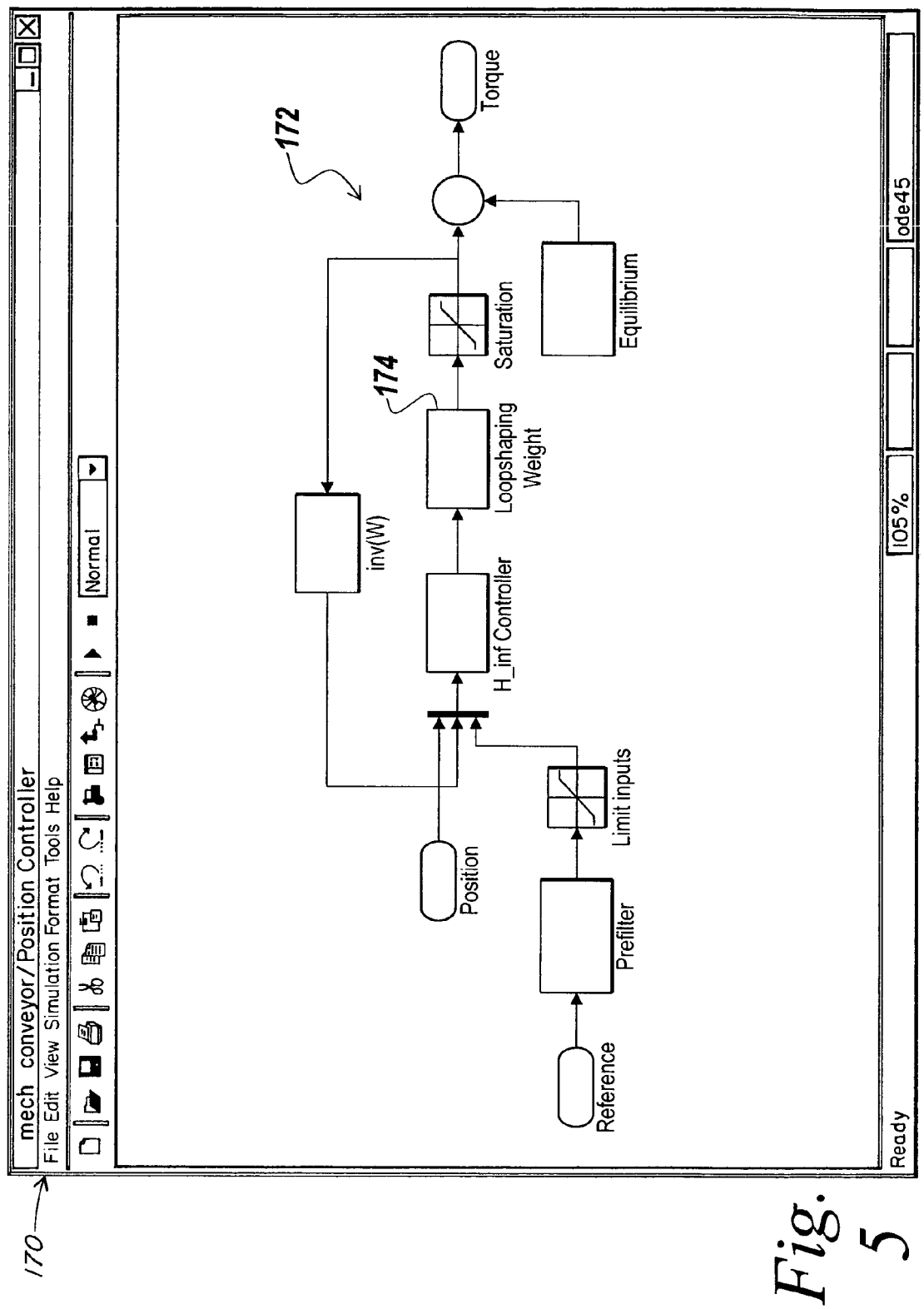

A block in FIG. 3 may represent a subsystem of the overall physical system, and may be represented by a number of subblocks. For example, referring to FIG. 5, a GUI 170 allows a user to define a model 172 of a "Position Control" block 150 of FIG. 3 by using a number of subblocks (e.g., 174).

The following describes in more detail how mechanical systems may be simulated using SimMechanics® to generate code suitable for execution on real-time machines.

Simulation with SimMechanics®

A multibody system can be viewed as an abstract collection of bodies whose relative motions are constrained by means of joints and other constraints. The multibody system can be represented by an abstract graph, in which the bodies are represented by nodes, and the constraints (where pairs of bodies interact) are represented by edges. There are two different types of multibody systems: one type whose graphs are acyclic (often referred to as tree topology systems), and another type that has cyclic graphs with closed loops.

A multibody system may be represented by a set of equations:

$$\dot{q} = \tilde{H}v \quad \text{(Equ. 32)}$$

$$M(q)\dot{v} = F(t,q,v) + \tilde{H}^T(q)G^T(q,t)\lambda \quad \text{(Equ. 33)}$$

$$g(q,t) = 0 \quad \text{(Equ. 34)}$$

Here $q: \mathbb{R} \to \mathbb{R}^{n_q}$ is the vector of configuration variables used to define the configuration of the multibody system at any instant of time t. The mass matrix $M(q) \in \mathbb{R}^{n_v \times n_v}$ is a symmetric positive-definite matrix. The function $f: \mathbb{R} \times \mathbb{R}^{n_q} \times \mathbb{R}^{n_v} \to \mathbb{R}^{n_v}$ represents the contribution of centrifugal, Coriolis, and external forcing terms. The matrix $H: \mathbb{R}^{n_q} \to \mathbb{R}^{n_v}$ is a purely kinematic relationship between the velocity variable $v: \mathbb{R} \to \mathbb{R}^{n_v}$ and the derivative of the configuration variable q, expressed as $v = H(q)\dot{q}$. Often, H is the identity mapping matrix.

In the case of spatial mechanisms, it is convenient to use an over-parameterized representation of orientation to avoid the difficulties with representation singularities. In this case, the velocity variable v is taken to be the angular velocity $\omega$ of a body and q is taken to be a set of four Euler parameters representing the orientation of the body. The matrix H then represents the mapping from the time derivative of the vector q to the angular velocity vector $\omega$. The matrix $\tilde{H}: \mathbb{R}^{n_v} \to \mathbb{R}^{n_q}$ denotes the right inverse of H. Typically, H has full row rank in which case $\tilde{H} = H^T(HH^T)^{-1}$.

The equation $g: \mathbb{R}^{n_q} \times \mathbb{R}^{n_v} \to \mathbb{R}^{n_m}$ defines an $n_q - n_m$ dimensional time-dependent sub-manifold of $\mathbb{R}^{n_q}$, and it is assumed that the velocity constraint Jacobian $$G = \frac{\partial g}{\partial q}$$

has full row rank (it is further assumed that $g \in C^2$ is twice continuously differentiable). The time variable t in the constraint equations allows for modeling of explicit motion drivers. Consistency is required among these drivers. The variable $\lambda$ represents the vector of Lagrange multipliers associated with the constraint forces.

The form of the equations of motion and the structure of their matrices depend on the type of coordinates that define the configuration of the system.

Relative Versus Absolute Coordinate Formulations

The equations need to be formulated in a way that is both transparent to analysis and allows efficient computation of the acceleration vector $\dot{v}$. In this regard, the two most popular choices of coordinates are relative coordinates and absolute coordinates (or reference coordinates).

When absolute coordinates are used, each body in the mechanism is given six degrees of freedom by describing its position as a reference point on the body and its orientation with a set of four Euler parameters. In this approach, the mass matrix M(q) is block diagonal. Each interaction between a pair of bodies (an example being two bodies connected by a joint) is represented by a set of constraint equations. This leads to a model that has a large number of configuration variables (the dimension of q can be large even for simple systems), and a correspondingly large number of constraint equations. An advantage of absolute coordinate formulations is uniformity and ease of constraint representation.

When relative coordinates are used, the number of coordinates necessary for representing the configuration may be reduced by implicitly parameterizing certain constraints (for example, joint interactions) between bodies. This re-parameterization is accomplished by restricting the relative motion between bodies to an allowable subspace. This typically results in fewer variables in the configuration vector q and a corresponding reduction in the number of constraint equations, as compared to the absolute coordinate formulation. Some systems that can be represented by acyclic graphs, the constraints can be completely eliminated, whereas systems represented by cyclic graphs still generate constraint equations. While the dimension of q and the number of constraint equations is reduced, the mass matrix M(q) may become dense and the constraint equations become more complicated to express. The computational cost of constructing and inverting the mass matrix contributes to the overall computational cost of the formulation.

Recursive computational techniques can be used to factorize the mass matrix and to invert it efficiently, even when using a relative coordinate formulation. For this reason, the SimMechanics® solvers use a relative coordinate formulation together with recursive computational procedures. This is in keeping with the general approach to system simulation currently used in Simulink®, which is based around ODEs. The formulation is amenable to integration by all of the existing numerical solvers in Simulink®. The choice of relative coordinates allows a class of mechanisms (for example, robotic systems) to be simulated without constraint equations. Where constraints do arise, they will be few in number, making it easier to solve them efficiently.

Unconstrained Systems

The following describes simulation of a class of multibody systems represented by noncyclic graphs, which are also known as branched trees because the graphs have the form of a rooted tree. An example of such multibody systems is a simple-chain system where each body is connected to a unique predecessor body and a unique successor body (with the exception of the first and last bodies in the chain) by joints. Common examples include robotic manipulators.

A number of techniques can be used for solving the dynamics of these systems, including the composite rigid body method (CRBM), which has a complexity of $O(n^3)$, and the articulated body method (ABM), which has a complexity of $O(n)$. CRBM is described in an article by M. W. Walker, D. E. Orin, "Efficient Dynamic Computer Simulation of Robotic Mechanisms," Journal of Dynamic Systems, Measurement and Control, 104, 1982, pp. 205-211. ABM is described in "The Calculation of Robot Dynamics Using Articulated-Body Inertias" by R. Featherstone, International Journal of Robotics Research, 2(1), 1983, pp. 13-30, "Robot Dynamics Algorithms" by R. Featherstone, Kluwer Academic Publishers, 1987, "Kalman Filtering, Smoothing and Recursive Robot Arm Forward and Inverse Dynamics" by G. Rodriguez, IEEE Journal of Robotics and Automation, 3 (6), 1987, pp. 624-639, and "A Spatial Operator Algebra for Manipulator Modeling and Control" by G. Rodriguez, A. Jain, K. Kreutz-Delgado, The International Journal of Robotics Research, 10 (4), 1991, pp. 371-381.

Figure 6:
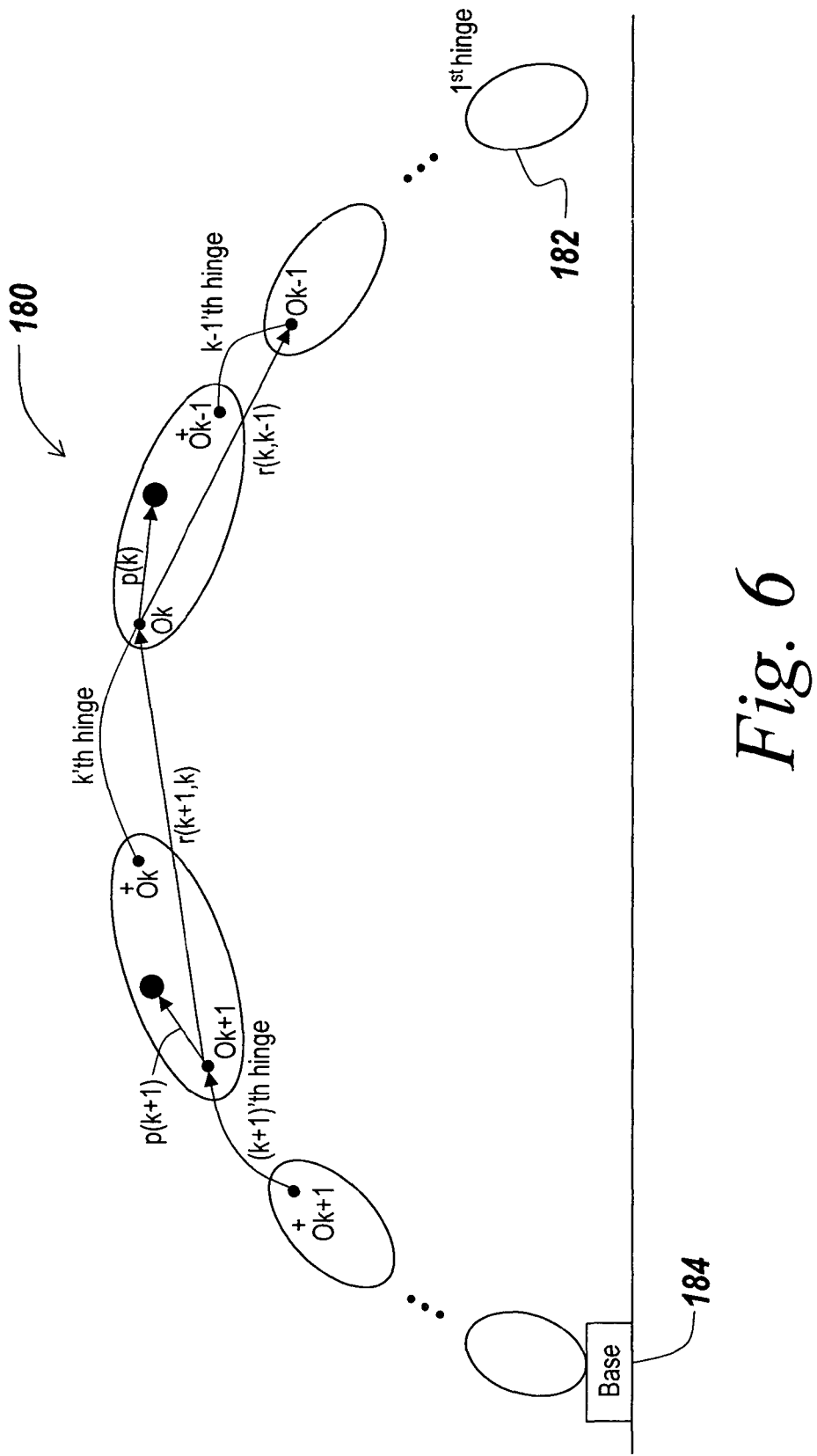
FIG. 6 shows a linked chain system.

Referring to FIG. 6, an n-link serial chain 180 has links that are numbered consecutively from a tip 182 of the chain to a base 184 of the chain. Base 184 acts as an inertial reference frame. Each body (link) is connected to two joints, an inboard joint (closer to the base 184), and an outboard joint (closer to the tip 182). An arbitrary joint, the k-th joint, has an inboard side labeled $O_k^+$ attached to body k+1, and an outboard side labeled $O_k$ attached to the k-th body. On the k-th joint, the vector from the outboard side of the joint $O_k$ to the center of mass on the k-th body is denoted by p(k), and the vector from $O_k$ to $O_{k-1}$ is denoted by $r(k, k-1)$. This vector is involved in shifting forces and velocities between bodies.

The spatial velocity $V(k) \in \mathbb{R}^6$ at the outboard side of the k-th joint is defined by $V(k)=[\omega(k)^T, \omega(k)^T]^T$, where $\omega(k) \in \mathbb{R}^3$ is the angular velocity of the k-th body and $v(k) \in \mathbb{R}^3$ is the linear velocity of the k-th body at the point $O_k$. Here we assume that both vectors are expressed in inertial coordinates. The spatial force $f(k) \in \mathbb{R}^6$ applied by the k-th joint to the k-th body at the point $O_k$ is defined by $f(k)=[T(k)^T, F(k)^T]^T$, where $T(k) \in \mathbb{R}^3$ is the applied torque and $F(k) \in \mathbb{R}^3$ is the applied force, again expressed in inertial coordinates.

The spatial inertia matrix $M(k)$ is defined as:

$$M(k) = \begin{bmatrix} J(k) & m(k)\tilde{p}(k) \\ -m(k)\tilde{p}(k) & m(k)I_3 \end{bmatrix} \in \mathbb{R}^{6 \times 6}, \quad \text{(Equ. 35)}$$

where $m(k)$ is the mass of the k-th body, and $J(k) \in \mathbb{R}^{3 \times 3}$ is the inertia tensor of the k-th body about the center of mass, computed in inertial coordinates. Given a vector $p \in \mathbb{R}^3$, we let $\tilde{p} \in \mathbb{R}^{3 \times 3}$ denote the cross product matrix generated from the vector $p$. Thus, $\tilde{p}(k)$ denotes the cross product matrix generated from $p(k)$. Denote the time derivative of $V(k)$ by $\alpha(k)$. The following kinematics equations describe the motion of the chain:

$$V(k)=\phi^T(k+1,k)V(k+1)+H^T(k)\dot{q}(k), \; V(n+1)=0, \; k=n, n-1, \ldots, 1 \quad \text{(Equ. 36)}$$

$$\alpha(k)=\phi^T(k+1,k)\alpha(k+1)+H^T(k)\ddot{q}(k)+a(k), \; \alpha(n+1)=0, \; k=n, n-1, \ldots, 1 \quad \text{(Equ. 37)}$$

Here $q_k \in \mathbb{R}^{n_{q_k}}$ is the vector of configuration variables for the k-th joint, the columns of $H^T(k) \in \mathbb{R}^{6 \times n_{q_k}}$ span the relative velocity space between the k-th body and the (k+1)th body, and $\phi^T(k+1,k)$ is the transpose of the matrix $$\phi^T(k+1, k) = \begin{bmatrix} I_3 & \tilde{r}(k+1, k) \\ 0 & I_3 \end{bmatrix}, \quad \text{(Equ. 38)}$$

where the vector $r(k+1,k)$ is the vector from the outboard size of the (k+1)th joint to the outboard side of the k-th joint. The vector $a(k) \in \mathbb{R}^6$ represents the Coriolis acceleration of the k-th body and is given by $$a(k) = \begin{bmatrix} \tilde{\omega}(k+1)\,\omega(k) \\ \tilde{\omega}(k+1)(v(k) - v(k+1)) \end{bmatrix}. \quad \text{(Equ. 39)}$$

The role of various terms can be clarified with an example. Suppose the kth joint is a simple revolute joint. This joint only allows rotation between the (k+1)th body and the kth body. In this case, the variable $q(k)$ represents the rotation angle between the two bodies and the matrix $H(k)$ is given by $H(k)=[u_k^T, 0_{3 \times 1}^T]$, with $u_k \in \mathbb{R}^3$ being the unit vector along the instantaneus axis of the revolute joint (in inertial coordinates). The kinematic relationships for more complex joints can also be expressed in this form. The matrix $\phi(k+1,k)$ shifts spatial forces (according to the usual rules for shifting forces between points on a rigid body) from the point $O(k)$ to the point $O(k+1)$ while the transpose (or adjoint) shifts spatial velocities from $O(k+1)$ to $O(k)$. Given the joint velocity degrees of freedom (DoF) $\dot{q}_k$ and acceleration DoF $\ddot{q}_k$, these equations provide a simple recursive procedure for determining the velocities and accelerations of the bodies constituting the chain.

The equations of motion, formulated about the reference points $O(k)$, are $$f(k)=\phi(k,k-1)f(k-1)+M(k)\alpha(k)+b(k), \quad f(0)=0_{6 \times 1}, \; k=1, \ldots, n \quad \text{(Equ. 40)}$$

$$T(k)=H(k)f(k) \quad \text{(Equ. 41)}$$

The vector $b(k) \in \mathbb{R}^6$ is the gyroscopic force vector at $O(k)$:

$$b(k) = \begin{bmatrix} \tilde{\omega}(k) I(k) \omega(k) \\ m(k)\,\tilde{\omega}(k)\,\tilde{\omega}(k)\,p(k) \end{bmatrix}. \quad \text{(Equ. 42)}$$

Equ. 41 is obtained by performing a virtual work balance across the kth joint (a mass less entity). With the externally applied generalized torque vector (these could be torques or forces applied by motors around various joint axes) for the joint given by $T(k)$, we obtain $$T^T(k)\delta q_k = f^T(k)H^T(k)\delta q_k, \; \forall \delta q_k \in \mathbb{R}^{n_{q_k}}. \quad \text{(Equ. 43)}$$

Since $\delta_{q_k}$ is arbitrary, this gives the desired relationship between the externally applied generalized torque $T(k)$ and the reaction force $f(k)$. Equs. 37, 40, and 41 are similar to equations that arise in the optimal control equations of discrete dynamic systems, as discussed in "Applied Optimal Control" by A. E. Bryson, Y. Ho, Blaisdell Publishing, 1969. After substituting $f(k)=P(k)\alpha(k)+z(k)$, sweep methods lead to a discrete Riccati equation for $P(k)$ (which can be solved recursively) and then directly to the desired joint accelerations. The solution is expressed in matrix form, leading to a square factorization of the mass matrix and its inverse.

Recursive Solution

The recursive relationships can be expressed in matrix form as follows. Sum the velocity recursion and use the fact that $\phi(i, i)=I_6$ and $\phi(i, k)\phi(k, j)=\phi(i, j)$. The second relations follows from the fact that shifting a spatial force from $O_j$ to $O_k$ and then from $O_k$ to $O_i$ is equivalent to shifting the force directly from $O_j$ to $O_i$. Then $$V(k) = \sum_{i=k}^{n} \phi^T(i, k) H^T(i) \dot{q}_i. \quad \text{(Equ. 44)}$$

A natural definition of the matrix operators follows:

$$H^T = \text{diag}[H^T(1), \ldots, H^T(n)]. \quad \text{(Equ. 45)}$$

The operator $\phi$ is defined by:

$$\phi = \begin{bmatrix} I_{6 \times 6} & 0 & \cdots & 0 \\ \phi(2, 1) & I_{6 \times 6} & \cdots & 0 \\ \vdots & \vdots & \ddots & \vdots \\ \phi(n, 1) & \phi(n, 2) & \cdots & I_{6 \times 6} \end{bmatrix} \quad \text{(Equ. 46)}$$

In terms of the matrix $\phi$, the velocity and force recursions can be written as $$V = \phi^T H^T \dot{q}, \quad \text{(Equ. 47)}$$

$$\alpha = \phi^T [H^T \ddot{q} + a], \quad \text{(Equ. 48)}$$

$$f = \phi[M\alpha + b] \quad \text{(Equ. 49)}$$

$$T = Hf \quad \text{(Equ. 50)}$$

where the spatial velocity vector V is defined as $V^T = [V^T(1), V^T(2), \ldots, V^T(n)] \in \mathbb{R}^{6n}$, and similarly for the spatial acceleration vector $\alpha \in \mathbb{R}^{6n}$, the Coriolis acceleration vector $a \in \mathbb{R}^{6n}$, the gyroscopic force vector $b \in \mathbb{R}^{6n}$, and the spatial force vector $f \in \mathbb{R}^{6n}$. Finally the matrix $M \in \mathbb{R}^{6n \times 6n}$ is defined to be $M = \text{diag}[M(1), M(2), \ldots, M(n)]$. Substituting into the last equation, we obtain the equations of motion:

$$T = H\phi M\phi^T H^T \ddot{q} + H\phi[M\phi^T a + b]. \quad \text{(Equ. 51)}$$

Equ. 51 is the same as what would result from a Lagrangian analysis of the system. We can see that the mass matrix Mass=$H\phi M\phi^T H^T$ and the Coriolis vector Cor=$H\phi[M\phi^T a + b]$ are both expressed in a factorized form. Equ. 51 can be implemented recursively. This form of the equations of motion is called the Newton-Euler factorization. Equ. 51 could be used to recursively compute $T - H\phi[M\phi^T a + b]$. One would update the positions and the velocities of all bodies in the chain using a base to tip recursion from knowledge of $q$ and $\dot{q}$, setting $\ddot{q} = 0$ in all the joints (an artificial zero acceleration computation), followed by a tip to base recursion to compute the spatial force vector $f$ that is consistent with this motion. The desired term is then given by $T - H\phi[M\phi^T a + b] = T - Hf$, where $f$ is the spatial force vector just computed. A similar strategy can be used to construct the mass matrix Mass. The CRBM is implemented in this fashion, but in order to compute the joint acceleration vector $\ddot{q}$, the mass matrix M is factorized, usually using Cholesky factorization, an $O(n^3)$ operation. Since the equations of motion have been expressed using relative coordinates, the mass matrix M is typically dense and there is little or no opportunity for exploiting any sparseness.

To derive the O(n) ABM, we first recast the kinematic and dynamic relationships into a block diagonal form. This is described in "The Formulation Stiffness of Forward Dynamics Algorithms and Implications for Robot Simulation" by B. Cloutier, D. Pai, U. M. Ascher, Proceedings of the IEEE Conference on Robotics and Automation, 1995. For instance, in the case of a chain with n=3 bodies, the equations can be written as $\tilde{M}\tilde{x} = \tilde{b}$, where $$\tilde{x} = \begin{bmatrix} -\alpha(1) \\ \ddot{q}(1) \\ f(1) \\ -\alpha(2) \\ \ddot{q}(2) \\ f(2) \\ -\alpha(3) \\ \ddot{q}(3) \\ f(3) \end{bmatrix}, \quad \tilde{b} = \begin{bmatrix} b(1) \\ T(1) \\ -a(1) \\ b(2) \\ T(2) \\ -a(2) \\ b(3) \\ T(3) \\ -a(3) \end{bmatrix}, \quad \text{(Equ. 52)}$$

$$\tilde{M} = \begin{bmatrix} M(1) & 0 & I_{6\times 6} & 0 & 0 & 0 & 0 & 0 & 0 \\ 0 & 0 & H(1) & 0 & 0 & 0 & 0 & 0 & 0 \\ I_{6\times 6} & H^T(1) & 0 & -\phi^T(2,1) & 0 & 0 & 0 & 0 & 0 \\ 0 & 0 & -\phi(2,1) & M(2) & 0 & I_{6\times 6} & 0 & 0 & 0 \\ 0 & 0 & 0 & 0 & 0 & H(2) & 0 & 0 & 0 \\ 0 & 0 & 0 & I_{6\times 6} & H^T(2) & 0 & -\phi^T(3,2) & 0 & 0 \\ 0 & 0 & 0 & 0 & 0 & -\phi(3,2) & M(3) & 0 & I_{6\times 6} \\ 0 & 0 & 0 & 0 & 0 & 0 & 0 & H(3) & 0 \\ 0 & 0 & 0 & 0 & 0 & 0 & I_{6\times 6} & H^T(3) & 0 \end{bmatrix} \quad \text{(Equ. 53)}$$

The elimination procedure then proceeds as follows. For $k = 1, 2, \ldots, n$, eliminate the off-diagonal terms in the middle row of each block using the first row of the block and then the last row of the block. Then using the kth block block-rows, eliminate the term $-\phi(k+1,k)$ coupling the kth block with the (k+1)th block. This elimination produces a decoupled (k+1)th block where only $M(k+1)$ needs to be updated to $$\hat{M}(k+1) = M(k+1) + \phi(k+1,k)\hat{M}(k)\phi^T(k+1,k) - \phi(k+1,k)\hat{M}(k)H^T(k)(H(k)\hat{M}(k)H^T(k))^{-1}H(k)\hat{M}(k)\phi^T(k+1,k),$$
$$\hat{M}(1) = M(1) \quad \text{(Equ. 54)}$$

A corresponding update to the right hand side replaces $T(k)$ with $\hat{T}(k) = T(k) - H(k)\hat{b}(k) - H(k)\hat{M}(k)a(k)$, where $$\hat{b}(k+1) = b(k+1) + \phi(k+1,k)[\hat{b}(k) + \hat{M}(k)a(k)] + \phi(k+1,k)\hat{M}(k)H^T(k)[H(k)\hat{M}(k)H^T(k)]^{-1}\hat{T}(k) \quad \text{(Equ. 55)}$$

Following this elimination procedure, the mass matrix has the zero structure given below (where a "x" stands for a possibly nonzero term and a ⊗ stands for a non-zero term).

$$\begin{bmatrix} x & 0 & x & 0 & 0 & 0 & 0 & 0 & 0 \\ 0 & \otimes & 0 & x & 0 & 0 & 0 & 0 & 0 \\ \otimes & x & 0 & x & 0 & 0 & 0 & 0 & 0 \\ 0 & 0 & 0 & x & 0 & x & 0 & 0 & 0 \\ 0 & 0 & 0 & 0 & \otimes & 0 & x & 0 & 0 \\ 0 & 0 & 0 & \otimes & x & 0 & x & 0 & 0 \\ 0 & 0 & 0 & 0 & 0 & 0 & x & 0 & x \\ 0 & 0 & 0 & 0 & 0 & 0 & 0 & \otimes & 0 \\ 0 & 0 & 0 & 0 & 0 & 0 & \otimes & x & 0 \end{bmatrix} \quad \text{(Equ. 56)}$$

This procedure yields a linear system of equations for q̈(k) and α(k). A back substitution gives the ABM, with the joint accelerations q̈(k) computed using the circled pivot blocks. Since all operations are done block-wise, the computation count is clearly O(n). These recursive techniques exploit the structure and sparsity pattern of the matrices that arise in the multibody dynamics problem to efficiently simulate systems represented by acyclic graphs. Recursive techniques are easily extended to arbitrary tree topologies and provide the underpinning of an efficient computational approach to the general case where constraints arise.

Constrained Systems

A general purpose solver must be capable of dealing with constrained mechanical systems where the underlying graph is cyclic. Systems that have a cyclic graph are reduced to an open spanning tree by the removal of a subset of the joints. The joints in this cut-set are replaced by a set of constraint equations to ensure that the spanning tree undergoes precisely the same motion as the original mechanism with the cyclic topology. The choice of joints in the cut-set is often not unique and has a direct effect on the number of generated constraint equations and the sparsity pattern of the resulting constraint Jacobian. The problem of making a suitable choice is related to the problems of ordering columns in sparse matrices and can be addressed with the techniques of graph theory. This is described in "Direct Methods for Sparse Matrices" by I. Duff, A. Erisman, J. Raid, Clarendon Press, Oxford, 1986.

One such choice is to choose the cut-set so as to maximize the number of independent loops, thereby transforming the constraint equations into smaller sets of independent equations which are easier to solve. SimMechanics® automatically selects the cut-set, but also provides an option to allow a user to determine the cut-set manually.

Efficient Computation of the Lagrange Multipliers

The equations of motion of the spanning tree can be expressed using the recursive relationships described previously. This step results in the descriptor form given by Equs. 32, 33, and 34. Since the descriptor form is an index-3 DAE, it is necessary to reduce the index by explicitly differentiating the constraints. If we differentiate the constraint g(q, t)=0 in Equ. 34 twice, we get $$G\tilde{H}v + \frac{\partial g}{\partial t} = 0 \qquad (\text{Equ. 57})$$

$$G\tilde{H}\dot{v} + \frac{\partial(G\tilde{H}v)}{\partial q}\tilde{H}v + 2\frac{\partial G}{\partial t}\tilde{H}v + \frac{\partial^2 g}{\partial t^2} = 0 \qquad (\text{Equ. 58})$$

Substituting the equation of motion in Equ. 33 into Equ. 58 gives $$M\dot{v} = f + \tilde{H}^T G^T \lambda \qquad (\text{Equ. 59})$$

$$G\tilde{H}M^{-1}\tilde{H}^T G^T \lambda = f_\lambda \qquad (\text{Equ. 60})$$

The vector $f_\lambda$ is given by $$f_\lambda = -G\tilde{H}M^{-1}f - \frac{\partial(G\tilde{H}v)}{\partial q}\tilde{H}v - 2\frac{\partial G}{\partial t}\tilde{H}v - \frac{\partial^2 g}{\partial t^2}. \qquad (\text{Equ. 61})$$

Equs. 59 and 60 can be treated as an index-1 DAE, as described in "Multibody System Simulation" by R. von Schwerin, Springer-Verlag, 1999. We can also solve λ directly and treat the system as an ODE on a manifold. In the index-1 DAE approach, it is possible to exploit the structure of the equations of motion, together with carefully designed multi-step integration schemes, to implement very efficient domain specific solvers for multibody systems. A disadvantage of this approach is that it may have numerical drift.

To prevent numerical drift, we consider the ODE approach, which requires computing the Lagrange multipliers efficiently. Because we have reduced the DAE to an ODE on a manifold, blindly integrating the resulting ODE numerically gives a solution that drifts away from the desired manifold given by g(q,t)=0. This is described in "Stabilization of DAE's and invariant manifolds" by U. Ascher, H. Chin, Numer. Math., 67, 1994, pp. 131-149, and "Conservation Laws and the Numerical Solution of ODE's, II" by L. F. Shampine, Computers and Mathematics with Applications, 38, 1999, pp. 61-72. The same is true of the index-1 DAE approach.

An alternative procedure is to eliminate the Lagrange multipliers from the analysis and to make use of coordinate partitioning to split the variables into independent and dependent sets. This is described in "A Hybrid Constraint Stabilization Generalized Coordinate Partitioning Method for Machine Dynamic Simulation" by T. Park, E. Haug, J. Mech. Trans. Auto. Des., 108 (2), 1986, pp. 211-216, and "Generalized Coordinates Partitioning for Dimension Reduction in Analysis of Constrained Dynamic Systems" by R. Wehage, E. Haug, J. Mech. Des., 104, 1982, pp. 247-255. The existence of such a partitioning, at least locally, follows directly from the implicit function theorem and is equivalent to an explicit local parameterization of the manifold.

Integrating the subset of independent variables results in a projection of the mass matrix that eliminates the structure that we exploit in the O(n) computations. Thus, the parameterization is monitored and recomputed as the simulation proceeds since the choice of independent and dependent variables is somewhat arbitrary and is unlikely to be globally applicable.

The approach taken in SimMechanics® is a direct approach in some ways similar to the direct approach used to solve the index-1 DAEs arising in models that have algebraic loops. The Lagrange multipliers are computed using efficient recursive computations to evaluate the coefficient matrix $$\underline{\underline{\Lambda}} \Delta G\tilde{H}M^{-1}\tilde{H}^T G^T, \qquad (\text{Equ. 62})$$

and the vector $f_\lambda$. To demonstrate this, consider the problem of forming the coefficient matrix Λ. The velocity Jacobian can be factorized to give $$G = A\phi^T H^T, \qquad (\text{Equ. 63})$$

where the configuration-dependent matrix A(q, t) is determined by the nature of the constraints. Using this factorization, it is possible to generate the coefficient matrix in $O(n_c \times n)$ operations, where $n_c$ is the number of independent velocity constraint equations. Similarly the vector $f_\lambda$ can be computed very efficiently using the factorized form of the velocity Jacobian in Equ. 63. This allows $f_\lambda$ to be computed as the sum of a free acceleration solution (where the constraint forces are set to zero) and the product of the matrix A and its time derivative with the spatial acceleration vector determined from knowledge of q and v (but not v̇). This computation can be implemented using the recursive techniques described previously.

Solving for the Lagrange multipliers, λ still requires the coefficient matrix to be factorized. This is an $O(n_c^3)$ operation. Here we see the reasoning behind the use of a relative coordinate formulation. Since the number of constraint equations $n_c$ is typically small, it is still possible to efficiently compute the Lagrange multipliers. We note here that since the matrix Λ is symmetric and positive-definite, it is possible to solve for the Lagrange multipliers using an iterative solution technique like conjugate gradient iteration, all implemented using the matrix factorizations previously discussed. In the absence of roundoff effects, this approach could generate a solution in $O(n_c \times n)$ operations. However, in the general case where the coefficient matrix might be ill-conditioned, and in the absence of a suitable preconditioner, we choose to use the direct approach.

Handling Singularities

Mechanical systems can pass through singular configurations during their motion. Singular configurations exist when the number of independent constraint equations is reduced on a finite set of points in the configuration space. At such points, the coefficient matrix $\Lambda$ becomes rank deficient. It is still possible in principle to determine a vector of Lagrange multipliers (no longer unique) that satisfies the determining equation. In the vicinity of these singular points, the ill-conditioning of $\Lambda$ makes the computation of $\lambda$ sensitive to roundoff errors in $f_\lambda$. This is described in "Manipulator Inverse Kinematics Solutions Based on Vector Formulations and Damper Least Square Methods" by C. W. Wampler, IEEE Transactions on Systems, Man, and Cybernetics, SMC 16, 1986, pp. 93-101, and "Numerical Filtering for the Operation of Robotic Manipulators through Kinematically Singular Configurations" by A. A. Maciejewski, C. A. Klein, Journal of Robotic Systems, 5(6), 1988, pp. 527-552.

One approach to deal with singular configuration is the use of damped least squares. This approach minimizes the sum, $$\|\Lambda\lambda - f_\lambda\|^2 + \sigma^2 \|\lambda\|^2, \qquad \text{(Equ. 64)}$$

where $\sigma$ is the damping factor. Here, $\sigma$ controls the tradeoff between keeping the residual small and keeping the norm of $\lambda$ small in the vicinity of a singularity. There is no simple or generic method for determining a suitable damping factor $\sigma$, so we use a slightly different approach based on a truncated QR decomposition of $\Lambda$. This is similar to the truncated singular value decomposition approach, but it is computationally more efficient. The approach is based upon QR decomposition of $\Lambda$ with full columm pivoting $$\Lambda E = QR, \qquad \text{(Equ. 65)}$$

where E is a permutation matrix determined by the pivot selection. This is described in "Accuracy and Stability of Numerical Algorithms" by N. Hingam, SIAM, 1996.

The pivots are chosen so that the absolute values of the terms on the diagonal of R appear in numerically decreasing order: $|R(1, 1)| > |R(2, 2)| > \ldots |R(n_c, n_c)|$. This algorithm can be used to estimate the numerical rank of a matrix, and in our computations, we estimate the rank r according to $$r = \max_k : R(k, k) > n_c \varepsilon_M R(1, 1) \qquad \text{(Equ. 66)}$$

where $\varepsilon_M$ is the machine epsilon (distance from one to the next floating point number). A reliable manner of determining the numerical rank of a matrix is the singular value decomposition (described in "Matrix Computations" by G. Golub, C. Van Loan, Johns Hopkins University Press, 1996). The QR decomposition also works well in practice. If $r < n_c$, the decomposition can be written as $$\Lambda E = [\tilde{Q}\ \tilde{Q}^\perp] \begin{bmatrix} R_{11} & R_{12} \\ 0 & 0 \end{bmatrix}, \qquad \text{(Equ. 67)}$$

where $\tilde{Q} \in \mathbb{R}^{n_c \times r}$, $\tilde{Q}^\perp \in \mathbb{R}^{n_c \times (n_c - r)}$, $R_{11} \in \mathbb{R}^{r \times r}$, and $R_{12} \in \mathbb{R}^{r \times (n_c - r)}$. The solution $\lambda$ is then $$\lambda = E \begin{bmatrix} R_{11}^{-1} \tilde{Q}^T f_\lambda \\ 0_{(n_c - r) \times 1} \end{bmatrix}, \qquad \text{(Equ. 68)}$$

which is the minimum norm solution (in the Euclidean metric) in the projected subspace. SimMechanics® offers users the choice between a solver based on Cholesky decomposition of the coefficient matrix, which is numerically more efficient, and a solution based on the truncated QR decomposition, which is more robust in the presence of singularities.

Compensating for Numerical Drift

In the absence of roundoff, index reduction and integration of the resulting ODE would be adequate. However, due to roundoff, there is numerical drift of the solution from the invariant manifold $g(q, t)$. One solution is based on coordinate partitioning. The coordinates are split into independent and dependent sets. This solution requires finding a robust detection method for changing the parameterization needs to be found, and may not be suitable for real-time hardware-in-the-loop simulations.

Another solution is based on stabilization and coordinate projection, which is described in "Stabilization of DAE's and invariant manifolds" by U. Ascher, H. Chin, Numer. Math., 67, 1994, pp. 131-149; "Stabilization of Constrained Mechanical Systems with DAE's and Invariant Manifolds" by U. Ascher, H. Chin, L. Petzold, S. Reich, J. Mech. Struct. Machines, 23, 1993, pp. 135-158; "Stabilization of DAE's and Invariant Manifolds" by U. Ascher, H. Chin, S. Reich, Numer. Math. 1994; and "Stability of Computational Methods for Constrained Dynamics Systems" by U. Ascher, L. Petzold, SIAM J. SISI, 14, 1993, pp. 95-120.

Stabilization involves the addition of extra terms to the equation of motion. These terms vanish on the manifold $g(q, t) = 0$ but have the effect of making the solution asymptotically attractive to the manifold. If the solution does drift off the manifold, it is ultimately attracted back onto it, although there are no predefined bounds on the extent of the drift. One stabilization technique is Baumgarte stabilization. Baumgarte stabilization requires parameterization, and it may be difficult to establish a generic procedure for choosing these parameters to make the stabilization robust. This is described in "Real-Time Integration Methods for Mechanical System Simulation" by E. Haug, R. Deyo, NATO ASI Series, Springer, 1991. That the choice of suitable parameters depends on the discretization scheme used to integrate the equations of motion poses a practical limitation.

Coordinate Projection

Coordinate projection involves the numerical discretization of the ODE. At the end of the discretization step, the solution is projected onto the invariant manifold. This is described in "Conservation Laws and the Numerical Solution of ODE's, II" by L. F. Shampine, Computers and Mathematics with Applications, 38, 1999, pp. 61-72. The codes in the present Simulink® ODE suite, ode23, ode45, ode113 and ode15s, can all be adapted to allow for coordinate projection without compromising accuracy or efficiency. This is described in "The MATLAB® ODE Suite" by Lawrence F. Shampine, Mark W. Reichelt, SIAM J. Sci. Comp., 18, 1997, pp. 1-22.

Simulink® has an ODE suite that includes a projection method that can be called once the discretized solution has been updated following the acceptance of a successful step based on the error estimates. This allows Simulink® to be used with SimMechanics® in simulating mechanical systems. The scheme works for the one-step Runge-Kutta formulas ode23 and ode45, as well as for variable-step variable-order codes like ode113. The standard theory for convergence in backward differentiation formula (BDF) codes like ode15s is still applicable when projection is carried out in this way.

An advantage of the Simulink® solver suite is its ability to localize and detect events using discontinuity locking (to ensure that the integrators see a continuous vector field) and its ability to output solutions at any time in the interval of integration using continuous extension formulae. Both of these features are affected by projection. Simulink® allows users to refine the output from the solvers using efficient interpolation schemes, and these interpolated outputs typically satisfy the invariants to an accuracy comparable with the accuracy of the numerical solution.

In SimMechanics®, the interpolated values are further projected to ensure that the invariants are satisfied. Projection is also used in event location. The event location capabilities of the current Simulink® solvers are also built around the continuous extension formula and the use of switching functions to determine the exact location of events in time. The outputs of the interpolants are projected before sampling the switching functions so that the events are located correctly. This makes event location more expensive, but is provides robust event detection.

The projection approach is appropriate for a one-step method used to compute an approximate solution at time $t_{n+1}$ from a solution at $t_n$. The step size is h, and $t_{n+1}=t_n+h$. The solution takes the form $$\begin{bmatrix} q^*_{n+1} \\ v^*_{n+1} \end{bmatrix} = h\Phi(t_n, q_n, v_n). \tag{Equ. 69}$$

If we consider the nonlinear position constraint $g(q, t)=0$, the predicted position variables $q^*_{n+1}$ are projected onto the closest point on the manifold, denoted by $q_{n+1}$. How close depends on the metric and potentially on the weighting. In one example, if weights are used in ODE error estimation, the same weights are used in the projection scheme. Linearizing the constraints about the predicted value $q^*_{n+1}$ gives $$0=g(t_{n+1},q_{n+1})=g(t_{n+1},q^*_{n+1})+G(t_{n+1},q^*_{n+1})(q_{n+1}-q^*_{n+1})+O(\|q_{n+1}-q^*_{n+1}\|^2) \tag{Equ. 70}$$

To leading order, the projected solution $q_{n+1}$ is obtained from solving $$G\delta=g \tag{Equ. 71}$$

$$q_{n+1}=q^*_{n+1}-\delta \tag{Equ. 72}$$

If the Euclidean norm is used, $$\delta=G^T(GG^T)^{-1}g. \tag{Equ. 73}$$

The projection process is repeated and so is referred to as sequential projection, until a suitable level of convergence is attained. This is more efficient than forming the full set of Karush-Kuhn-Tucker (KKT) equations to determine the exact minimization on the manifold and is easily motivated by the fact that error control has made the predicted solution $q^*_{n+1}$ close to the manifold already.

In one example, the projection is performed in a weighted norm. The projection weights reflect the weights used in the error control of the ODE solver. In SimMechanics®, a user can terminate the projection process based on relative and absolute tolerances for δ. The user can also carry on the projection process to completion. This implies that the iteration is continued until the new iterates fail to reduce the residual due to rounding error.

Stabilization for Code Generation

Stabilization codes are suitable for use in stand-alone code for simulation and deployment on rapid prototyping systems that requires real-time simulation. A generalization of the Baumgarte technique can be implemented without the need for selecting problem-specific parameters. For notational convenience, suppressing explicit time dependence, we can write the reduced ODE representation (with the Lagrange multipliers eliminated) of Equs. 32, 33, and 34 as:

$$\dot{z}=\hat{f}(z), \tag{Equ. 74}$$

$$0 = c(z) = \begin{bmatrix} g(q) \\ G(q)\tilde{H}(q)v \end{bmatrix}. \tag{Equ. 75}$$

Here the variable z is defined as $z^T=[q^T, v^T]^T$. A family of stabilization processes have the form:

$$\dot{z}=\hat{f}(z)-\gamma F(z)c(z), \tag{Equ. 76}$$

where $\gamma>0$ is a parameter, and $$F = D(CD)^{-1} \quad \text{and} \quad C(z) = \frac{\partial c}{\partial z}. \tag{Equ. 77}$$

The matrix C(z) is given by $$C(z) = \begin{bmatrix} G\tilde{H} & 0 \\ \frac{\partial(G\tilde{H}v)}{\partial q} & G\tilde{H} \end{bmatrix}, \tag{Equ. 78}$$

and D(z) is chosen such that CD is nonsingular. For instance, $$D = \begin{bmatrix} \tilde{H}^T G^T & 0 \\ 0 & \tilde{H}^T G^T \end{bmatrix}, \tag{Equ. 79}$$

which gives, $$F = \begin{bmatrix} \tilde{H}^T G^T (G\tilde{H}\tilde{H}^T G^T)^{-1} & 0 \\ 0 & \tilde{H}^T G^T (G\tilde{H}\tilde{H}^T G^T)^{-1} \end{bmatrix} \tag{Equ. 80}$$

$$\begin{bmatrix} I & 0 \\ -\frac{\partial(G\tilde{H}v)}{\partial q}\tilde{H}^T G^T (G\tilde{H}\tilde{H}^T G^T)^{-1} & I \end{bmatrix}.$$

The stabilization scheme is implemented as follows. Start with $(q_n, v_n)$ at time $t_n$ and integrate with some ODE numerical method to advance the solution to $(q^*_{n+1}, v^*_{n+1})$ at $t=t_{n+1}$. Stabilize, by modifying the solution $$\begin{bmatrix} q_{n=1} \\ v_{n+1} \end{bmatrix} = \begin{bmatrix} q^*_{n+1} \\ v^*_{n+1} \end{bmatrix} - F(q^*_{n+1}, v^*_{n+1}) h(q^*_{n+1}, v^*_{n+1}). \qquad \text{(Equ. 81)}$$

Since the term $$\frac{\partial(G\tilde{H}v)}{\partial q}$$

is expensive to compute, a cheaper alternative is to use $$F = \begin{bmatrix} M^{-1}\tilde{H}^T G^T (G\tilde{H}M^{-1}\tilde{H}^T G^T)^{-1} & 0 \\ 0 & M^{-1}\tilde{H}^T G^T (G\tilde{H}M^{-1}\tilde{H}^T G^T)^{-1} \end{bmatrix}, \qquad \text{(Equ. 82)}$$

obtained by neglecting the $$\frac{\partial(G\tilde{H}v)}{\partial q}$$

term and setting $$D = \begin{bmatrix} M^{-1}\tilde{H}^T G^T & 0 \\ 0 & M^{-1}\tilde{H}^T G^T \end{bmatrix}. \qquad \text{(Equ. 83)}$$

This is similar to projection. However, this projection is carried out in a metric defined by the positive-definite mass matrix Mass. This scheme is efficient because the term $\Lambda = G\tilde{H}M^{-1}\tilde{H}^T G^T$ has already been computed and factorized when the Lagrange multipliers are found. The stabilization step is computationally cheap and ideal for real-time applications.

Another approach (described in "Stabilization of DAE's and invariant manifolds" by U. Ascher, H. Chin, Numer. Math., 67, 1994, pp. 131-149) is to use the cheaper variant of F, but to apply the scheme twice. This adds a small amount of computation cost but increases the accuracy. This is the scheme that users can choose when simulating systems in SimMechanics® with stabilization and is the scheme used to generate code for constrained systems.

Redundant Constraints

When using a mechanical simulation tool, it is easy to generate redundant constraints. In this case, the constraint Jacobian G fails to be surjective, and the redundant constraints need to be identified and removed. An additional consequence is that the constraint forces are no longer unique. This may not be important if the primary interest is the motion of the system, but it may be important if the constraint forces themselves are of interest. SimMechanics® allows users to move certain joints and constraints with known time trajectories (motion drivers). This feature is often used in computed-torque control schemes and biomechanics applications. It is possible for the user to overspecify the motions or to impose inconsistent motions between the driven joints.

SimMechanics® uses a relative coordinate formulation, and the motion drivers are treated differently according to the nature of the graph associated with the system. For systems that have an acyclic graph, the motions induced by motion drivers has to be consistent, and they can be dealt with efficiently using the recursive methods described previously without the need for any constraint equations.

Inconsistencies may arise in systems that have a cyclic topology. For these systems, we need to distinguish between motion drivers applied to the joints in the spanning tree and motion drivers applied to joints in the cut-set. Drivers that are applied to joints in the spanning tree can be dealt with without adding additional constraint equations using recursive methods. They are checked for consistency.

Drivers applied to joints in the cut-set may result in additional constraint equations, and if these are redundant, they can result in inconsistent motions. The following describes how the redundant constraints are resolved and how potential inconsistencies are detected in SimMechanics®. These issues can also arise during simulation when joints lock or unlock due to stiction behavior.

The primary tool used in this analysis is the QR decomposition with full column pivoting, as described in "Accuracy and Stability of Numerical Algorithms" by N. Hingam, SIAM, 1996. We begin by reordering the rows and columns of G $$G(q,t) = \begin{bmatrix} G_{11}(q) & G_{12}(q) \\ G_{21}(q) & G_{22}(q) \end{bmatrix} \begin{bmatrix} q_1 \\ q_2 \end{bmatrix}, \qquad \text{(Equ. 84)}$$

where $q^T = [q_1^T, q_2^T]$ has been partitioned into a set of unknown configuration variables $q_1 \colon \mathbb{R} \to \mathbb{R}^{n_1}$ and a set of known, time-dependent variables, $q_2 \colon \mathbb{R} \to \mathbb{R}^{n_2}$, $n_1 + n_2 = n_q$. The columns of G have been partitioned accordingly. Similarly the rows of G have been ordered such that the rows associated with the homogeneous constraint equations appear first and the rows associated with motion drivers applied to joints in the cut-set appear below them. The velocity constraints then take the form $$\begin{bmatrix} G_{11}(q) & G_{12}(q) \\ G_{21}(q) & G_{22}(q) \end{bmatrix} \begin{bmatrix} q_1 \\ q_2 \end{bmatrix} = \begin{bmatrix} 0 \\ -\frac{\partial g_{21}}{\partial t} \end{bmatrix}. \qquad \text{(Equ. 85)}$$

In deriving Equ. 85, for simplicity, we ignored nonholonomic constraints, but they can also be included in the analysis.

Redundancy and consistency are detected before the simulation is started. The first task is to detect potential inconsistencies in the motion drivers applied to the joints in the spanning tree. To this end, we determine the effective rank of the following submatrix $$QR = \begin{bmatrix} G_{11} \\ G_{21} \end{bmatrix} E, \qquad \text{(Equ. 86)}$$

where E is a permutation matrix determined by the pivoting strategy in the QR decomposition. Using the technique discussed previously about Lagrange multipliers, we determine the numerical rank of this matrix. To determine potential inconsistencies in the motion drivers, and to provide feedback to identify which drivers cause the difficulty, the columns of the submatrix $[G_{12}{}^T G_{22}{}^T]^T$ are appended, one by one, and the QR decomposition recomputed. After k such stages, we obtain the following decomposition $$QR = \begin{bmatrix} G_{11} & G_{12} \\ G_{21} & G_{22} \end{bmatrix} \begin{bmatrix} I & 0 \\ 0 & F_k \end{bmatrix} E. \qquad \text{(Equ. 87)}$$

Here $F_k$ is the matrix that selects the first k columns of $[G_{12}{}^T G_{22}{}^T]^T$. If, in this process, the rank of the augmented matrix increases, we have identified (1) that a potential inconsistency exists, and (2) the driver causing the inconsistency. Increasing the rank of the augmented matrix, and the fact that the elements of $q_2$ are arbitrary quantities determined by the user, implies that a solution to the velocity constraint equation may not exist. It is possible for the user to define the motions of the drivers in such a way that they are consistent. If the user does not define the motions of the drivers properly, an error is reported if inconsistencies are detected.

Having verified that the motion drivers in the spanning tree are consistent, we move to the task of eliminating redundancies among the homogeneous constraints. To achieve this we compute the QR decomposition of the submatrix $$QR = G_{11}{}^T E \qquad \text{(Equ. 88)}$$

This allows us to identify and eliminate the dependent rows. Finally we append the constraints generated by motion drivers applied to joints in the cut-set, one by one. After k stages, we obtain the following decomposition $$QR = [\, G_{11}^T \quad G_{21}^T F_k^T \,], \qquad \text{(Equ. 89)}$$

where $F_k$ selects out the first k rows of $G_{21}$. If the rank of the augmented matrix increases, we have again identified a possible inconsistency between the motion drivers and the source of the inconsistency.

Typically, mechanical systems have few explicit motion drivers, and this computation need only be performed once (except when discrete topology changes occur due to stiction). One difficulty with this approach arises when a simulation is started from a singular configuration. In this case, the analysis eliminates a constraint or constraints that are instantaneously redundant. Consequently, the system likely violates the constraint as the simulation progresses. SimMechanics® detects the constraint violation, but at present does not automatically detect whether the simulation is being started from such a singular configuration.

Consistent Initial Conditions

The reduction of a DAE to an ODE requires that we compute initial conditions that are consistent with the position and velocity constraints:

$$g(q,t)=0 \qquad \text{(Equ. 90)}$$

$$G(q,t)v + \frac{\partial g}{\partial t} = 0 \qquad \text{(Equ. 91)}$$

Suitable regularity assumptions ensure existence and uniqueness of solutions to the ODE but only a subset of these will satisfy the constraints. The problem of generating consistent initial conditions is different from the projection problem discussed in the section on "compensating for numerical drift." In the projection case, we typically have a good initial estimate of the solution (q, v) making the nonlinear position constraint much easier to solve. We do not have such an initial estimate to determine consistent initial conditions.

The definition of a mechanical model in SimMechanics® requires that specific geometric relationships between bodies connected by joints be adhered to. For example, two bodies connected by a revolute joint must be attached to the joint coincident points. This restriction implies that the position and velocity constraints are automatically satisfied for systems that have acyclic graphs. This is also true of the spanning tree of a system that has a cyclic graph. There are exceptions to this rule. SimMechanics® implements a class of disassembled joints, which do not have to satisfy the geometric relationships, and SimMechanics® allows users to impose finite initial joint displacements on the system.

Disassembled joints can be used in cyclic systems and are automatically placed in the cut set. The constraint equations are satisfied for these joints. Even when the system is defined in an assembled configuration, an arbitrary finite displacement of a joint DoF will result in constraint violation. The projection solvers in SimMechanics® are based on a modified Gauss-Newton solver with a trust region approach to improve robustness (this is described in "Numerical Methods for Unconstrained Optimization and Nonlinear Equations" by J. Dennis, R. Schnabel, SIAM, 1996). For the finite displacement problem at assembly, we use a homotopy (continuation) solver to achieve a better level of robustness. The problem is embedded in a one-parameter family of solutions using an artificial homotopy. The homotopy parameter $\lambda$ is introduced to give the modified problem:

$$\tilde{f}(q,\lambda)=g(q,0)-(1-\lambda)g(q_0,0). \qquad \text{(Equ. 92)}$$

Here, $q_0 \in \mathbb{R}^{n_q}$ is the initial guess. Homotopy techniques exploit the contractive properties of the manifold, $$\tilde{f}(q,\lambda)=0 \qquad \text{(Equ. 93)}$$

to obtain efficient numerical procedures that evolve the solution from $q_0$ at $\lambda=0$ to the desired value at $\lambda=1$. This is described in "Numerical Continuation Methods: An Introduction" by E. Allgower, K. Georg, Springer-Verlag, 1990.

The velocity constraints are linear in the velocity variable and can be solved directly once the position constraints have been satisfied. All finite displacements introduced at the start of simulation are tested for consistency using the methods described in the section on "redundant constraints" before attempting assembly.

Linearization

A large class of dynamical systems can be satisfactorily controlled using the highly developed tools of linear control theory. To facilitate this it is necessary to obtain linear models of the system dynamics that accurately reflect the behavior of the system in the neighborhood of a specified nominal trajectory. For mechanical systems, we start with the reduced ODE form $$\dot{q}=\tilde{H}(q)v, \qquad \text{(Equ. 94)}$$

$$\dot{v}=\hat{F}(t,u,q,v), \qquad \text{(Equ. 95)}$$

where $\hat{F}: \mathbb{R} \times \mathbb{R}^{n_u} \times \mathbb{R}^{n_q} \times \mathbb{R}^{n_v} \to \mathbb{R}^{n_v}$ is given by:

$$\hat{F} = M^{-1}[f + \tilde{H}^T G^T (G \tilde{H} M^{-1} \tilde{H}^T G^T)^{-1} \quad \text{(Equ. 96)}$$

$$(-G\tilde{H}M^{-1}f - \frac{\partial(G\tilde{H}v)}{\partial q}\tilde{H}v - 2\frac{\partial G}{\partial t}\tilde{H}v - \frac{\partial^2 g}{\partial t^2})].$$

We have included the dependence of the dynamics on exogenous inputs (external forces and motor torques) through the vector u: $\mathbb{R} \to \mathbb{R}^{n_u}$. Linearization about a nominal trajectory ($\bar{u}, \bar{q}, \bar{v}$) proceeds by introducing perturbations ($\delta u, \delta q, \delta v$) and expanding the equations about the nominal trajectory to get:

$$\dot{\bar{v}} + \delta \dot{v} = \hat{F}(t, \bar{u}, \bar{q}, \bar{v}) + \frac{\partial \hat{F}}{\partial u}(t, \bar{u}, \bar{q}, \bar{v})\delta u + \frac{\partial \hat{F}}{\partial q}(t, \bar{u}, \bar{q}, \bar{v})\delta q + \quad \text{(Equ. 97)}$$

$$\frac{\partial \hat{F}}{\partial v}(t, \bar{u}, \bar{q}, \bar{v})\delta v + O(\|\delta u\|^2, \|\delta q\|^2, \|\delta v\|^2)$$

To first order, this gives a time-varying representation of the perturbative dynamics:

$$\delta \dot{v} = \frac{\partial \hat{F}}{\partial u}(t, \bar{u}, \bar{q}, \bar{v})\delta u + \frac{\partial \hat{F}}{\partial q}(t, \bar{u}, \bar{q}, \bar{v})\delta q + \frac{\partial \hat{F}}{\partial v}(t, \bar{u}, \bar{q}, \bar{v})\delta v. \quad \text{(Equ. 98)}$$

Simulink® can numerically linearize dynamic systems to generate the desired linear representation. Simulink® can incorporate analytic derivatives (either determined internally or provided by the user) of blocks or subsystems using linear fractional transformations. This is useful to generate linear models that accurately reflect the dynamics of cyclic systems. Perturbation (numerical or otherwise) introduced to determine the linear dynamics need to satisfy the constraints to the same order of accuracy as the linearized dynamics. Since Simulink® is a general purpose solver, the perturbation is introduced to linearize the reduced differential equations of motion without knowledge of the constraint manifold. Since cyclic systems have constraints, only a subset of the perturbed motions satisfy Equs. 94 and 95 to first order and also satisfy the constraints to the same order.

Acyclic systems can be linearized in the standard manners, so we concentrate on the cyclic case. Here, a linearization of the mechanical subsystem is provided to Simulink®. Simulink® can then linearize a system containing other blocks and subsystems that are connected to the mechanical subsystem. Since the linearization of an interconnection can be obtained by the interconnection of the linearizations, Simulink® can construct the linearized model for the whole system (mechanical and other) efficiently. The task then falls on SimMechanics® to register a linearization method with Simulink® and to construct the desired linearization of the mechanical components. For cyclic systems, this means linearizing the ODE on the constraint manifold. The perturbation satisfies $$g(\bar{q},t) + G(\bar{q},t)\delta q = 0 \quad \text{(Equ. 99)}$$

$$G(\bar{q}, t)\delta \dot{q} + G(\bar{q} + \delta q, t)\dot{\bar{q}} + \frac{\partial q}{\partial t} = 0 \quad \text{(Equ. 100)}$$

To introduce perturbations that satisfy the constraints, the coordinates are partitioned into dependent and independent sets. The configuration variables are partitioned as $q^T = [q_d^T, q_i^T]$ where $q_d: \mathbb{R} \to \mathbb{R}^{n_c}$ is the set of dependent variables and $q_i: \mathbb{R} \to \mathbb{R}^{n_q - n_c}$ is the set of independent variables. A similar partition is introduced for the velocity variables $v = [v_d^T, v_i^T]$ where $v_d: \mathbb{R} \to \mathbb{R}^{n_c}$ and $v_i: \mathbb{R} \to \mathbb{R}^{n_v - n_c}$. The partitioning scheme is implemented using a QR decomposition similar to that already discussed, except that here we allow users to control the selection of variables to be placed in the independent set. The consistency and redundancy analysis is performed before the model is linearized and allows a choice of independent variables to be checked. If multiple linearizations are sought over a nominal trajectory, SimMechanic® retains the initial choice of independent variables to prevent undesired discontinuities in the state matrices.

The linearization is still implemented numerically. The independent variables are perturbed, and the corresponding perturbations in the dependent variables determined to satisfy Equs. 99 and 100. The dynamics are then evaluated to generate a column in the linear matrices. The resulting linearization satisfies the constraint equations to first order. But it is not minimal because the linearized model and the original nonlinear model are assumed to have the same number of states (a standard assumption at present in Simulink® and for ODE systems in general). For cyclic systems, the number of independent states $n_i < n_q$ suffices to determine the linear dynamics. The non-minimal states are easily identified, as they are not reachable from the inputs or detectable from the outputs, and can be eliminated by the user.

Numerical linearization in SimMechanics® allows users to specify a tolerance for the relative perturbation of the components in the state vector. SimMechanics® also supports an adaptive perturbation procedure. This procedure uses the initial perturbations defined by the user and attempts to obtain a good tradeoff between truncation error and rounding error. Simulink® then uses the linearized model of the mechanical components to obtain the linearization for the system as a whole.

Trimming and Equilibrium Determination

Trimming of dynamic systems is an important part of control design. Usually control laws are designed to control systems about equilibrium configurations. Simulink® allows general dynamic systems to be trimmed through the MATLAB® interface.

As with linearization, trimming acyclic systems poses no additional difficulties since the equations of motion are ODEs. Cyclic systems introduce difficulties because it is necessary to account for the constraints. The problem of trimming a cyclic system can be posed as follows. Find the states of the joints in the spanning tree to (1) satisfy the trim targets, and (2) satisfy the constraint equations. SimMechanics® has a trimming mode where the position and velocity residuals are exported as outputs from the Simulink® block diagram. In this mode, the user is able to set up very general trimming problems with the additional requirement that the position and velocity constraint residuals be driven to zero.

This allows any mechanical system modeled in SimMechanics® to be trimmed using the MATLAB® interface.

An alternative approach to trimming cyclic systems is through inverse dynamics. Here, unknown states in joints lying in the spanning tree can be driven with explicit motion drivers. The inputs to these motion drivers become the unknown variables in the trim problem. SimMechanics® is able to compute the generalized forces that are consistent with the imposed motions. These generalized forces become the outputs of the trim problem. A trim condition can be found by setting to zero the nonlinear equations that map the inputs (to the motion drivers) to the outputs (excess generalized forces that are over and above any generalized forces that might be applied to the specific joint DoF through physical actuators). The advantage to using this approach is that the user no longer has to worry about the constraints, which are imposed internally. Inverse dynamics trimming does require SimMechanics® to solve the kinematics of the cyclic system each time the function is evaluated. This can be less accurate and somewhat slower for certain types of systems. It is left to users to decide which approach is best for their applications.

Handling Events

Mechanical systems can undergo discrete topological changes when joint DoFs lock up when subjected to static friction (stiction). SimMechanics® allows users to model the topology changes that come about from stiction in joints using actuators that can be connected to a subset of the joints.

Simulink® can detect events through discontinuity locking and switching functions. In Simulink®, the continuous portions of the vector field are called modes, and modes are changed if and when a switching function becomes zero. In mechanical systems, there is a possibility of multiple mode changes at an instant of time. A joint locking can easily result in another joint surpassing a friction limit and consequently unlocking. It is difficult to determine beforehand the mode transition for the mechanical system as a whole when a switching function crosses zero. This problem can be addressed using complementarity theory. The approach used in SimMechanics® is to introduce a mode iteration into Simulink®. In this approach the predicted mode change is introduced and the system analyzed to determine whether the mode change is consistent with motion of, and forces applied to, the system. If the mode is not correct, an iteration is implemented to find the mode that is consistent with the motion and forces applied. In this way, SimMechanics® is able to detect multiple events at a single time instant and to select the correct mode for the whole system before restarting the integration.

An additional difficulty with discrete topology changes occurs in cyclic systems. Here, it is possible for joint locking, or unlocking, to cause inconsistencies between applied motion drivers or to introduce/eliminate redundancies among constraint equations. To ensure motion consistency and to determine the active constraint set, the redundancy analysis of the section on "redundant constraints" is repeated when an event is detected. To make the analysis more efficient, we bypass sequential addition of the motion drivers to determine the source of any inconsistencies. Instead, during simulation we add all of the motion drivers and error out if any inconsistencies are detected following a topology change.

Using the methods described above, a user can simulate mechanical systems that undergo discrete topology changes in real-time. Hardware in the loop (HIL) simulation of drivetrain components is an important part of the rapid prototyping environment used in the design of automatic control systems for vehicles. These systems exhibit discrete topology changes when clutches are locked and unlocked. For HIL simulations, these topology changes are modeled in real-time. SimMechanics® generates code for mechanical systems that exhibit this type of behavior with one exception. The mode iteration described earlier is disabled in real-time simulation. The reasons are twofold: firstly, accurate event location is a limitation in real-time simulation; and secondly, the mode iteration process does not terminate in a deterministic number of floating point operations. For real-time systems, the mode iteration is instead carried out over multiple time-steps.

The present built-in event handling capabilities of Simulink® further allow users to model a restricted class of contact and impact problems. The penalty method provides an approach for dealing with contact between bodies with simple geometries. Joint limits, for example, can be modeled using the hit-crossing block to detect impact between bodies with known geometrical shape. A force penetration law can be used to impose the unilateral contact constraint. This can be implemented using standard Simulink® blocks and the stiff solver capabilities of codes like ode15s.

Although some examples have been discussed above, other implementation and applications are also within the scope of the following claims For example, process 100 may be used to simulate electrical systems, or systems that involve fluid dynamics or chemical reactions.

What is claimed is:

1. A computer-implemented method comprising:
generating and storing a modular graphical representation of a physical system using one or more graphical modules and one or more variables, the generating including:
representing one or more portions of the physical system using the one or more graphical modules,
representing one or more parameters of the physical system using the one or more variables, and
defining a connection topology between the one or more graphical modules in the modular graphical representation of the physical system, the connection topology including one or more motion drivers to move one or more joints and/or one or more constraints with one or more known time trajectories;
generating code according to the modular graphical representation, the code suitable to be compiled into a machine code that is executed on hardware to:
simulate the physical system in real time,
detect an inconsistent motion of one or more motion drivers before initiating the simulation of the physical system using QR decomposition as an orthogonal matrix triangularization,
identify the one or more motion drivers that cause the inconsistent motion, and
solve inconsistency resulting from the inconsistent motion of the one or more motion drivers before initiating the simulation of the physical system by redefining motions of the one or more motion drivers such that the motions are consistent, the code containing instructions to cause the hardware to solve a system of differential algebraic equations (DAEs);
storing the generated code;
compiling the generated code into the machine code; and
executing the machine code to solve the system of DAEs.

2. The method of claim 1 in which the system of DAEs has the form $F(t,y(t),y'(t))=0$, where t is a variable, y is a function of t, F is a function of t, y, and y', and the Jacobian of F with respect to y' (denoted by $\partial F/\partial y'$) is singular.

3. The method of claim 1 in which the system of DAEs includes a differential equation and an algebraic equation representing constraints on the one or more variables.

4. The method of claim 3 in which the code contains instructions to cause the hardware to solve the DAEs using a discrete integration process.

5. The method of claim 4 in which the code contains instructions to cause the hardware to derive a first solution for the one or more variables that satisfy the differential equation, and derive a second solution for the one or more variables that satisfy the algebraic equation based on the first solution.

6. The method of claim 5 in which the code contains instructions to cause the hardware to derive the second solution from the first solution using an iterative process that ends when the solutions converge within a predefined threshold.

7. The method of claim 5 in which the code contains instructions to cause the hardware to derive the second solution from the first solution using a truncated iterative process that ends after a predefined number of iterations.

8. The method of claim 5 in which the code contains instructions to cause the hardware to derive the second solution by projecting the first solution to a constraint manifold specified by the algebraic equation.

9. The method of claim 1 in which the code contains instructions to cause the hardware to convert the system of DAEs into a system of ordinary differential equations (ODEs).

10. The method of claim 9 in which the code contains instructions to cause the hardware to add a stabilization term to the system of ODEs, the stabilization term comprising a constraint specified by the algebraic equation.

11. The method of claim 10 in which the system of ODEs has the form $\dot{x}=f(x)$, the algebraic equation can be converted into the form $c(x)=0$, and the stabilization term has the form $-\gamma \cdot F(x) \cdot c(x)$, where x is a variable, $\dot{x}$ is a derivative of x with respect to time, F is a function of x, and $\gamma$ is a constant.

12. The method of claim 11 in which $$\gamma = \frac{1}{h},$$

where h is the step size of a discrete integration process used to solve the system of ODEs.

13. The method of claim 11 in which x is a vector comprising variables derived from the one or more variables used in the modular representation of the physical system.

14. The method of claim 10 in which the stabilization term is designed so that when a numerical integration process is used to solve the system of ODEs with the stabilization term, the solutions are stabilized compared to solutions derived using the numerical integration process to solve the system of ODEs without the stabilization term.

15. The method of claim 10 in which the stabilization term is designed to reduce drift of solutions to the system of ODEs derived when the solutions are derived using a discrete integration process.

16. The method of claim 1 in which the physical system comprises multiple objects that are coupled together.

17. The method of claim 1 in which the physical system comprises a mechanical system.

18. The method of claim 1 in which the physical system comprises an electrical system.

19. The method of claim 1 in which the physical system comprises a pneumatic or hydraulic system.

20. The method of claim 1 in which a portion of the modular representation represents chemical reactions.

21. The method of claim 1 in which a portion of the modular representation represents fluid dynamics.

22. The method of claim 1, further comprising compiling the code to generate the machine code.

23. The method of claim 22 further comprising executing the machine code on the hardware.

24. The method of claim 1 in which one of the one or more variables represents an input of the physical system, one of the one or more variables represents an output of the physical system, and one of the one or more variables represents a state of the physical system.

25. The method of claim 1 in which the system of DAEs includes a term representing a derivative of one of the one or more variables with respect to time.

26. A system comprising:
a display device for displaying a graphical user interface (GUI) to allow a user to:
generate and store a modular representation of a system using one or more modules and one or more variables, the one or more modules representing one or more portions of the system, the one or more variables representing one or more parameters of the system, and
define a connection topology between the one or more modules in the modular representation of the system, the connection topology allowing modeling of a contact and an impact between at least two physical bodies; and
a processor configured to implement:
a code generator to:
generate and store code according to the modular representation, the code suitable to be compiled into a machine code that is executed on hardware to simulate the system in real time and to model the contact and the impact between the at least two physical bodies, the code containing instructions to cause the hardware to solve a set of differential algebraic equations (DAEs) that represents relationships among the one or more variables, and
allow a choice between code that implements a truncated projection process and code that implements a stabilization process for simulating the system in real time,
the truncated projection process including projecting a solution onto a constraint at the end of an iteration in a numerical integration process, a number of iterations of the truncated projection process being restricted to a redetermined number, and
the stabilization process including modifying ordinary differential equations generated from an index reduction of the set of DAEs, and
a code execution engine to execute the machine code for solving the set of DAEs.

27. The system of claim 26 in which the GUI provides a functionality to allow specific values to be assigned to the one or more variables.

28. The system of claim 26 in which the GUI provides the one or more modules to construct a model of a mechanical system.

29. The system of claim 26 in which the code comprises source code written in a programming language.

30. The system of claim 26, further comprising the hardware used to simulate the system.

31. The system of claim 30 in which the hardware comprises a microprocessor or a microcontroller.

* * * * *

UNITED STATES PATENT AND TRADEMARK OFFICE
CERTIFICATE OF CORRECTION

PATENT NO. : 7,904,280 B2
APPLICATION NO. : 10/414811
DATED : March 8, 2011
INVENTOR(S) : Giles D. Wood It is certified that error appears in the above-identified patent and that said Letters Patent is hereby corrected as shown below:

On the Cover Page, page 2, under Other Publications, please delete "Lawrence et al. "Sovling Index-1" please replace with -- Lawrence et al. "Solving Index-1 --

On the Cover Page, page 2, under Other Publications, please delete "Gu et al. "Co-Simulation of Coupled Dynamic Subsystems: A Differential Algebraic Approch using Singulary Perturbed Sliding Manifolds" Proceedings of the American Control Conference, Jun. 2000."

On the cover Page, page 2, under Other Publications, please delete "Shampine et al., "The MATLAB ODE Suite," SIAM J. Sci. Comp., 18, 1997, pp. 1-22."

Signed and Sealed this
Thirty-first Day of May, 2011

David J. Kappos
*Director of the United States Patent and Trademark Office*